United States Patent
Lee et al.

(10) Patent No.: US 12,469,563 B2
(45) Date of Patent: Nov. 11, 2025

(54) SERIAL-GATE TRANSISTOR AND NONVOLATILE MEMORY DEVICE INCLUDING THE SAME

(71) Applicant: SAMSUNG ELECTRONICS CO., LTD., Suwon-si (KR)

(72) Inventors: Cheonan Lee, Suwon-si (KR); Kiwhan Song, Suwon-si (KR); Gyosoo Choo, Suwon-si (KR); Sukkang Sung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 18/120,244

(22) Filed: Mar. 10, 2023

(65) Prior Publication Data
US 2024/0046994 A1 Feb. 8, 2024

(30) Foreign Application Priority Data
Aug. 8, 2022 (KR) .................. 10-2022-0098804

(51) Int. Cl.
*G11C 16/08* (2006.01)
*G11C 16/14* (2006.01)
(Continued)

(52) U.S. Cl.
CPC ............. *G11C 16/14* (2013.01); *G11C 16/08* (2013.01); *H10B 41/27* (2023.02); *H10B 41/35* (2023.02);
(Continued)

(58) Field of Classification Search
CPC ....................................................... G11C 8/08
See application file for complete search history.

(56) References Cited

U.S. PATENT DOCUMENTS 6,222,788 B1 4/2001 Forbes et al.
6,380,765 B1 4/2002 Forbes et al.
(Continued)

FOREIGN PATENT DOCUMENTS

KR 10-2015-0044327 A 4/2015
KR 10-1784999 B1 11/2017
(Continued)

OTHER PUBLICATIONS

Communication issued on Dec. 13, 2023 by the European Patent Office for European Patent Application No. 23160217.8.

*Primary Examiner* — Jason Lappas
(74) *Attorney, Agent, or Firm* — Sughrue Mion, PLLC

(57) ABSTRACT

The present disclosure provides serial-gate transistors and nonvolatile memory devices including serial-gate transistors. In some embodiments, a nonvolatile memory device includes a plurality of memory blocks, a plurality of pass transistor blocks, and a plurality of gates sequentially arranged in a horizontal direction in a gate region above a semiconductor substrate. Each of the plurality of pass transistor blocks includes a plurality of serial-gate transistors configured to transfer a plurality of driving signals to a corresponding memory block of the plurality of memory blocks. Each of the plurality of serial-gate transistors includes a first source-drain region, a gate region, and a second source-drain region that are sequentially arranged in a horizontal direction at a semiconductor substrate. The plurality of gates are electrically decoupled from each other. A plurality of block selection signals respectively applied to the plurality of gates are controlled independently of each other.

20 Claims, 22 Drawing Sheets

(51) Int. Cl.
  *H10B 41/27* (2023.01)
  *H10B 41/35* (2023.01)
  *H10B 41/40* (2023.01)
  *H10B 43/27* (2023.01)
  *H10B 43/35* (2023.01)
  *H10B 43/40* (2023.01)

(52) U.S. Cl.
  CPC ............ *H10B 41/40* (2023.02); *H10B 43/27* (2023.02); *H10B 43/35* (2023.02); *H10B 43/40* (2023.02)

(56) References Cited

U.S. PATENT DOCUMENTS

| | | | |
|---|---|---|---|
| 6,882,023 B2 | 4/2005 | Khemka et al. | |
| 8,362,550 B2 | 1/2013 | Rexer et al. | |
| 8,373,164 B2 | 2/2013 | Yamazaki et al. | |
| 8,982,639 B2 | 3/2015 | Kim et al. | |
| 9,142,297 B2 | 9/2015 | Kim et al. | |
| 10,319,738 B2 * | 6/2019 | Kim | H10B 43/40 |
| 10,347,318 B2 | 7/2019 | Kim et al. | |
| 10,438,671 B1 | 10/2019 | Chen et al. | |
| 10,446,565 B2 | 10/2019 | Oh et al. | |
| 2002/0085418 A1 | 7/2002 | Goto et al. | |
| 2004/0126975 A1 | 7/2004 | Ahmed et al. | |
| 2005/0029545 A1 | 2/2005 | Forbes et al. | |
| 2015/0102336 A1 | 4/2015 | Kang et al. | |
| 2017/0200740 A1 | 7/2017 | Kang et al. | |

FOREIGN PATENT DOCUMENTS

| | | |
|---|---|---|
| KR | 10-1900843 B1 | 11/2018 |
| KR | 10-2019-0015773 A | 2/2019 |
| KR | 10-2020-0093481 A | 8/2020 |
| KR | 10-2327113 B1 | 11/2021 |
| KR | 10-2374066 B1 | 3/2022 |

* cited by examiner

FIG. 3

| VSI > VWL | ON | VG1 > VSI, VG1 ≥ VG2 |
|---|---|---|
| | OFF | VG2 < VSI, VG1 ≥ VG2 |
| VSI < VWL | ON | VG2 > VWL, VG2 ≥ VG1 |
| | OFF | VG1 > VWL, VG2 ≥ VG1 |

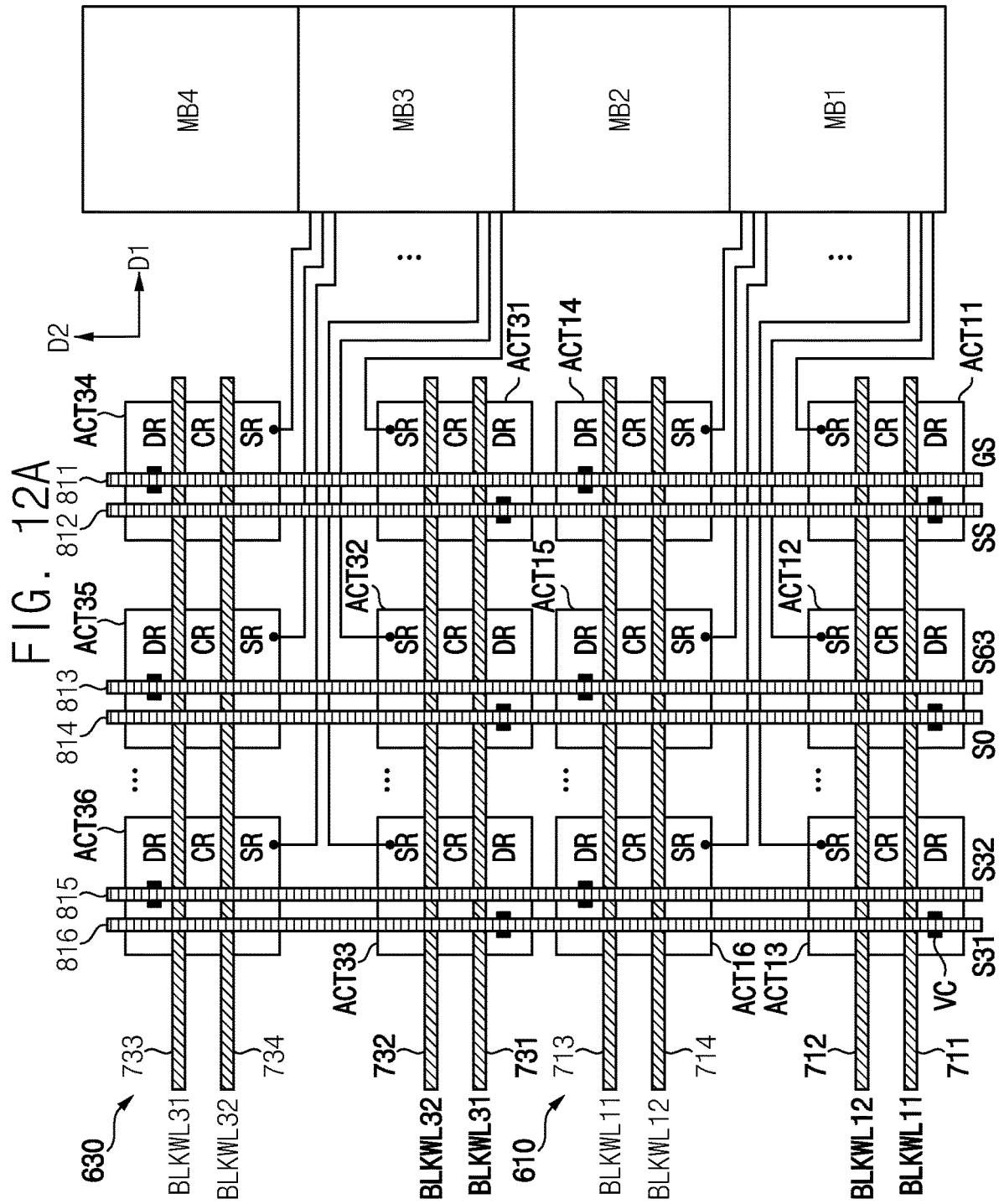

SERIAL-GATE TRANSISTOR AND NONVOLATILE MEMORY DEVICE INCLUDING THE SAME

CROSS-REFERENCE TO RELATED APPLICATION

This application claims benefit of priority under 35 U.S.C. § 119 to Korean Patent Application No. 10-2022-0098804, filed on Aug. 8, 2022, in the Korean Intellectual Property Office (KIPO), the disclosure of which is incorporated by reference herein in its entirety.

BACKGROUND

1. Field

The present disclosure relates generally to semiconductor integrated circuits, and more particularly, to a device including a source driving circuit.

2. Description of Related Art

In related semiconductor integrated circuits, a high-voltage transistor may transfer a high voltage between source-drain regions of the high-voltage transistor. For example, a high voltage may be applied to a gate of the high-voltage transistor and a gate insulating film under the gate may have a sufficient thickness that may sustain the high voltage. Alternatively or additionally, a length of a channel of the high-voltage transistor may need to be longer than that of a low-voltage transistor, so as to endure an electric field. That is, the channel of the high-voltage transistor may need to endure a punch-through phenomenon by the high voltage between the source-drain regions. In other words, the high-voltage transistor may require an area wider than the low-voltage transistor.

SUMMARY

Some example embodiments may provide a serial-gate transistor and a nonvolatile memory device including the serial-gate transistor, that may be capable of reducing a peak electric field formed in the channel of the serial-gate transistor.

According to an aspect of the present disclosure, a nonvolatile memory device is provided. The nonvolatile memory device includes a plurality of memory blocks, a plurality of pass transistor blocks, and a plurality of gates. Each pass transistor block of the plurality of pass transistor blocks includes a plurality of serial-gate transistors configured to transfer a plurality of driving signals to a corresponding memory block of the plurality of memory blocks. Each serial-gate transistor of the plurality of serial-gate transistors includes a first source-drain region, a gate region, and a second source-drain region. The first source-drain region, the gate region, and the second source-drain region are sequentially arranged in a horizontal direction at a semiconductor substrate. The plurality of gates sequentially arranged in the horizontal direction in the gate region above the semiconductor substrate. The plurality of gates are electrically decoupled from each other. A plurality of block selection signals respectively applied to the plurality of gates are controlled independently of each other.

According to an aspect of the present disclosure, a serial-gate transistor is provided. The serial-gate transistor includes a first source-drain region, a gate region, a second source-drain region, and a plurality of gates. The first source-drain region, the gate region, and the second source-drain region are sequentially arranged in a horizontal direction at a semiconductor substrate. The plurality of gates sequentially arranged in the horizontal direction in the gate region above the semiconductor substrate. The plurality of gates are electrically decoupled from each other. A plurality of block selection signals respectively applied to the plurality of gates are controlled independently of each other.

According to an aspect of the present disclosure, a nonvolatile memory device is provided. The nonvolatile memory device includes a plurality of first bonding metal patterns disposed in a cell region, a plurality of second bonding metal patterns disposed in a peripheral region disposed under the cell region, a memory cell array disposed in the cell region, and a plurality of pass transistor blocks disposed in the peripheral region. The peripheral region is vertically coupled to the cell region by the plurality of first bonding metal patterns and the plurality of second bonding metal patterns. The memory cell array includes a plurality of memory blocks. Each pass transistor block of the plurality of pass transistor blocks includes a plurality of serial-gate transistors configured to transfer a plurality of driving signals to a corresponding memory block of the plurality of memory blocks. Each serial-gate transistor of the plurality of serial-gate transistors includes a first source-drain region, a gate region, and a second source-drain region. The first source-drain region, the gate region, and the second source-drain region are sequentially arranged in a horizontal direction at a semiconductor substrate. The plurality of gates sequentially arranged in the horizontal direction in the gate region above the semiconductor substrate. The plurality of gates are electrically decoupled from each other. A plurality of block selection signals respectively applied to the plurality of gates are controlled independently of each other.

In some embodiments, the serial-gate transistor and the nonvolatile memory device may reduce the peak electric field caused in the channel through the configuration of the serial-gate transistor and the independent control of the gate signals. The horizontal length of the channel may be reduced and the area of the serial-gate transistor and the nonvolatile memory device may be reduced, by decreasing the junction breakdown voltage, the tunneling current, the gate induced drain leakage (GIDL) current and the hot carrier injection through the reduction of the peak electric field.

BRIEF DESCRIPTION OF DRAWINGS

Example embodiments of the present disclosure will be more clearly understood from the following detailed description taken in conjunction with the accompanying drawings.

FIG. 3 is a diagram illustrating an operation of the serial-gate transistor of FIG. 2, according to example embodiments.

FIGS. 12A and 12B are diagrams illustrating layouts of pass transistor blocks included in the row decoder of FIG. 10, according to example embodiments.

DETAILED DESCRIPTION

Figure 1:
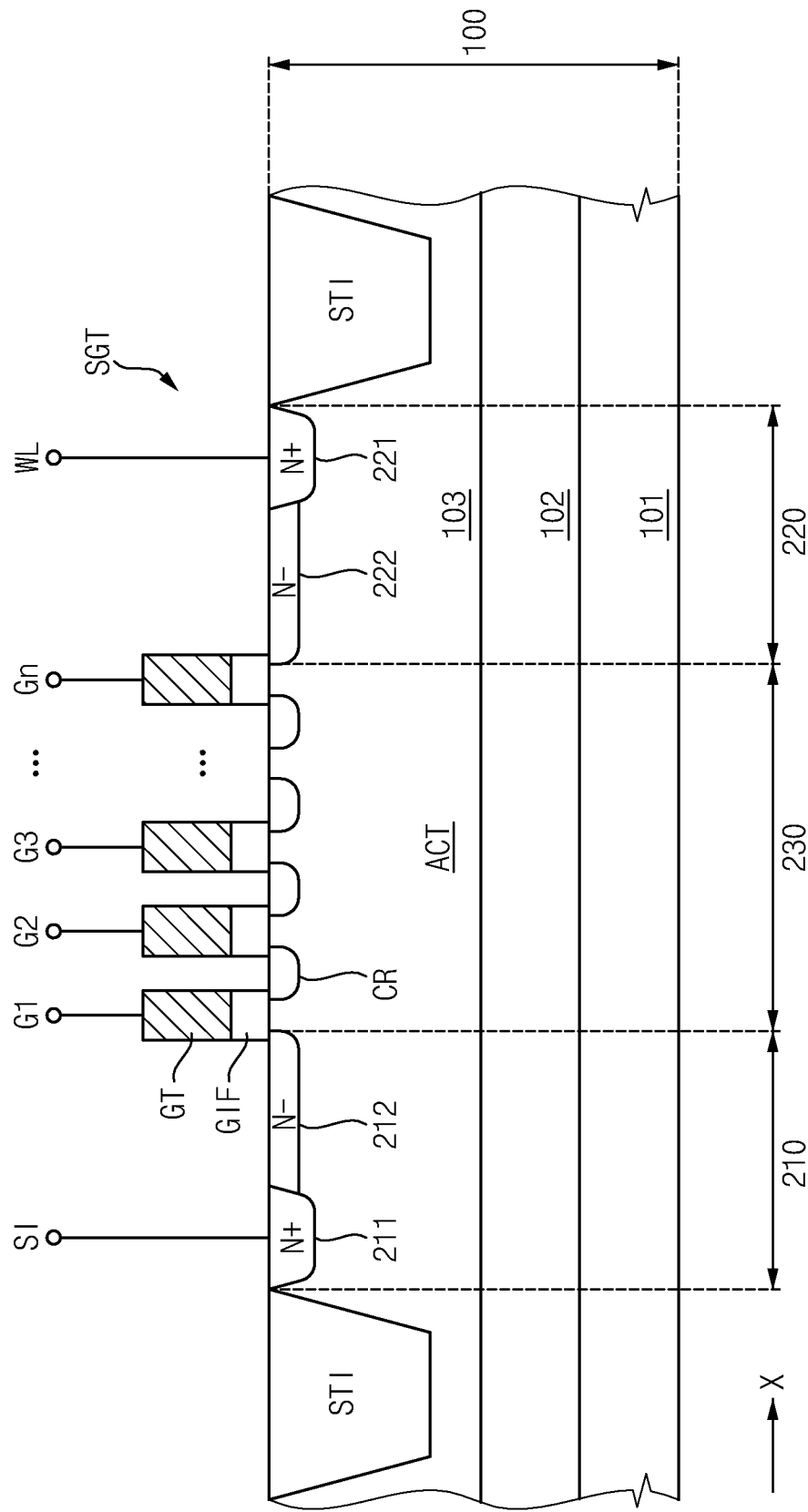
FIG. 1 is a cross-sectional diagram illustrating a serial-gate transistor, according to example embodiments.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," third" to be used to describe relative positions of elements. The terms "first," "second," third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

FIG. 1 is a cross-sectional diagram illustrating a serial-gate transistor, according to example embodiments.

Referring to FIG. 1, a serial-gate transistor SGT may include a first source-drain region 210, a second source-drain region 220, a gate region 230 and a plurality of gates GT.

The first source-drain region 210, the gate region 230 and the second source-drain region 220 may be sequentially arranged in a horizontal direction X at a semiconductor substrate 100. The plurality of gates GT may be sequentially arranged in the horizontal direction X in the gate region 230 above the semiconductor substrate 100.

The plurality of gates GT may be electrically disconnected from each other. That is, the plurality of gates GT may be spaced apart from each other in the horizontal direction X. The lengths of the plurality of gates GT in the horizontal direction X may be identical to each other and/or some gates of the plurality of gates GT in may have the different lengths in the horizontal direction X. The intervals between two gates of the plurality of gates GT may be identical to each other and/or some intervals may be different.

In some embodiments, a plurality of gate signals (e.g., G1 to Gn, where n is an integer greater than 0) may be respectively applied to the plurality of gates GT and may be controlled independently of each other. The independent control of the plurality of gate signals G1-Gn is described with reference to FIGS. 3 and 13A through 14C.

In some example embodiments, to form high voltage transistors, a deep N-well 102 may be formed on a P-type region 101 of the semiconductor substrate 100. A P-well 103 may be formed on the deep N-well 102. An active region ACT may be formed in the P-well 103 by doping N-type dopants. The active region ACT may be defined by a region between two shallow trench insulating regions STI.

Gate lines corresponding to the plurality of gates GT may be formed above the semiconductor substrate 100 corresponding to the gate region 230. Gate insulating films (GIF) may be formed between the plurality of gates GT and the upper surface of the semiconductor substrate 100.

In some example embodiments, the first source-drain region 210 may include a first region 211 and a second region 212. A driving signal SI may be applied to the first region 211. For example, the first region 211 may be formed by doping N-type dopants in the P-well 103 of the semiconductor substrate 100 with a first dopant density N+. The second region 212 may be formed by doping N-type dopants in the P-well 103 between the first region 211 and the gate GT with a second dopant density N− lower than the first dopant density N+. In some example embodiments, the first region 211 and the second region 212 may be formed simultaneously (e.g., at substantially the same time) by doping N-type dopants with the same dopant density.

The second source-drain region 220 may include a third region 221 and a fourth region 222. A target node (e.g., a wordline WL) to which a high voltage of the driving signal SI is transferred may be connected to the third region 221. Hereinafter, example embodiments are described based on the target node being the wordline WL. According to example embodiments, the target node may be another node different from the wordline WL. For example, the third region 221 may be formed by doping N-type dopants in the P-well 103 of the semiconductor substrate 100 with the first dopant density N+. The fourth region 222 may be formed by doping N-type dopants in the P-well 103 between the third region 221 and the gate GT with the second dopant density N− lower than the first dopant density N+. In some example embodiments, the third region 221 and the fourth region 222 may be formed simultaneously by doping N-type dopants with the same dopant density.

The gate region 230 may include a plurality of central regions CR 231 that are formed in the P-well 103 of the semiconductor substrate 100 between the plurality of gates GT. In some example embodiments, the plurality of central regions CR 231 may be formed by doping the same N-type dopants with the second dopant density N− as the second region 212 and the fourth region 222, or with a dopant density different from the second dopant density N−. In some example embodiments, the plurality of central regions CR 231 may be formed by doping the same P-type dopants as the P-well 103. In some example embodiments, the plurality of central regions CR 231 may be the P-well 103 itself. That is, doping of the plurality of central regions CR 231 may be omitted. If the doping of the central regions CR 231 is omitted, the threshold voltage of the serial-gate transistor SGT may be increased but the peak electric field may be decreased by smoothing of the electric field. Alternatively or additionally, if the plurality of central regions CR 231 are doped, the threshold voltage may be decreased by improving body effect. The type of doping and/or the dopant density of the central regions CR 231 may be determined considering the trade-off relations of the threshold voltage and the peak electric field.

Hereinafter, for convenience of illustration and descriptions, example embodiments are described based on the serial-gate transistor SGT including two gates. However, the present disclosure not limited in this regard. For example, the same example embodiments may be applied to the serial-gate transistor SGT including three or more gates.

Figure 2:
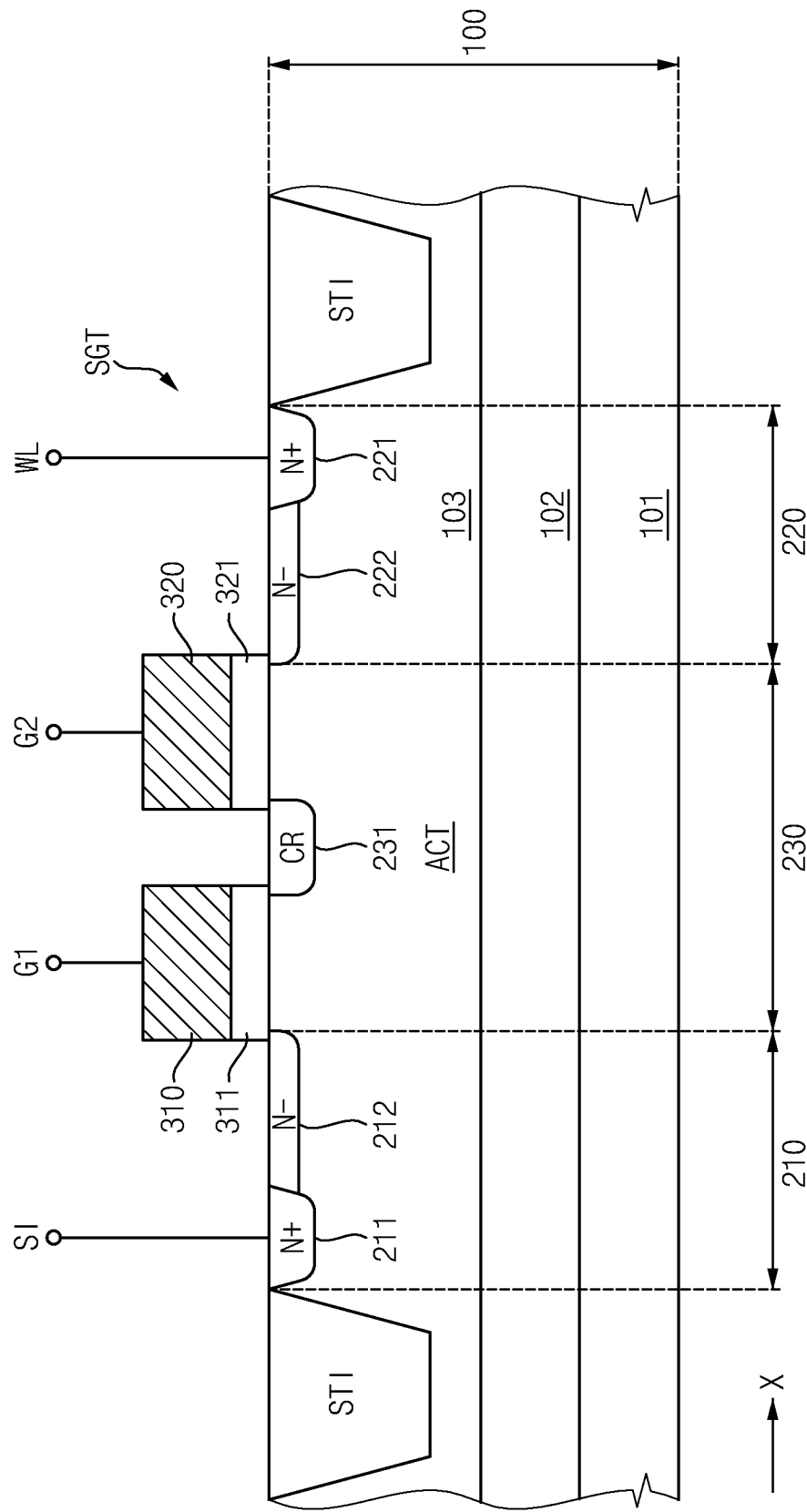
FIG. 2 is a cross-sectional view illustrating a serial-gate transistor including two gates, according to example embodiments.

FIG. 2 is a cross-sectional view illustrating a serial-gate transistor including two gates, according to example embodiments. The serial-gate transistor of FIG. 2 may include or may be similar in many respects to the serial-gate transistor described above with reference to FIG. 1 and may include additional features not mentioned above. As such, for the sake of brevity, the descriptions repeated with FIG. 1 may be omitted.

Referring to FIG. 2, a serial-gate transistor SGT may include a first source-drain region 210, a second source-drain region 220, a gate region 230, a first gate 310 and a second gate 320.

The first source-drain region 210, the gate region 230 and the second source-drain region 220 may be sequentially arranged in a horizontal direction X at a semiconductor substrate 100. The first gate 310 and the second gate 320 may be arranged in the horizontal direction X in the gate region 230 above the semiconductor substrate 100. Gate insulating films 311 and 321 may be formed between the first gate 310 and the second gate 320, and the upper surface of the semiconductor substrate 100.

The first gate 310 adjacent to the first source-drain region 210 in the horizontal direction X and the second gate 320 adjacent to the second source-drain region 220 may be electrically disconnected from each other. In other words, the first gate 310 and the second gate 320 may be spaced apart from each other in the horizontal direction X. The lengths of the first gate 310 and the second gate 320 in the horizontal direction X may be identical to each other and/or different from each other.

Alternatively or additionally, a first gate signal G1 applied to the first gate 310 and a second gate signal G2 applied to the second gate 320 may be controlled independently of each other. The independent control of the first gate signal G1 and the second gate signal G2 is described below with reference to FIGS. 3 and 13A through 14C.

The gate region 230 may include a central region CR 231 that is formed in the semiconductor substrate 100 between the first gate 310 and the second gate 320.

FIG. 3 is a diagram illustrating an operation of the serial-gate transistor of FIG. 2, according to example embodiments.

Referring to FIGS. 2 and 3, when a voltage VSI of the driving signal SI applied to the first source-drain region 210 is higher than a voltage VWL of the wordline WL connected to the second source-drain region 220 (e.g., VSI>VWL) and the serial-gate transistor SGT is turned on (ON), a voltage VG1 of the first gate signal G1 may be activated to be higher than the voltage VSI of the driving signal SI (e.g., VG1>VSI) and a voltage VG2 of the second gate signal G2 may be activated to be lower than or equal to the voltage VG1 of the first gate signal G1 (e.g., VG1≥VG2).

In some embodiments, when the voltage VSI of the driving signal SI applied to the first source-drain region 210 is higher than the voltage VWL of the wordline WL connected to the second source-drain region 220 (e.g., VSI>VWL) and the serial-gate transistor SGT is turned on (ON), the second gate signal G2 may be activated after the first gate signal G1 is activated. In other words, as described below with reference to FIG. 13A, the activation time point of a first block selection signal BLKWL1 corresponding to the first gate signal G1 may precede the activation time point of a second block selection signal BLKWL2 corresponding to the second gate signal G2.

When the voltage VSI of the driving signal SI is higher than the voltage VWL of the wordline WL (e.g., VSI>VWL) and the serial-gate transistor SGT is turned off (OFF), the voltage VG2 of the second gate signal G2 may be deactivated to be lower than the voltage VSI of the driving signal SI (e.g., VG2<VSI) and the voltage VG1 of the first gate signal G1 may be deactivated to be higher than or equal to the voltage VG2 of the second gate signal G2 (e.g., VG1≥VG2).

In some embodiments, when the voltage VSI of the driving signal SI is higher than the voltage VWL of the wordline WL (e.g., VSI>VWL) and the serial-gate transistor SGT is turned off (OFF), the first gate signal G1 may be deactivated after the second gate signal G2 is deactivated. In other words, the deactivation time point of the first gate signal G1 may lag behind the deactivation time point of the second gate signal G2.

As such, when the voltage VSI of the driving signal SI applied to the first source-drain region 210 is higher than the voltage VWL of the wordline WL connected to the second source-drain region 220, the portion including the first source-drain region 210, the first gate G1 and the central region CR 231 may function as a field relaxation transistor (FRT) and the portion including the central region CR 231, the second gate G2 and the second source-drain region 220 may function as a switching transistor.

The field relaxation transistor (FRT) may perform the function of reducing the peak electric field applied in the drain and the switching transistor may perform the function of determining the on-current in the turned-on state of the serial-gate transistor SGT and the off-current in the turned-off state of the serial-gate transistor SGT.

When the voltage VSI of the driving signal SI applied to the first source-drain region 210 is lower than a voltage VWL of the wordline WL connected to the second source-drain region 220 (e.g., VSI<VWL) and the serial-gate transistor SGT is turned on (ON), the voltage VG2 of the second gate signal G2 may be activated to be higher than the voltage VWL of the wordline WL (e.g., VG2>VWL) and the voltage VG1 of the first gate signal G1 may be activated to be lower than or equal to the voltage VG2 of the second gate signal G2 (e.g., VG1≤VG2).

In some embodiments, when the voltage VSI of the driving signal SI is lower than the voltage VWL of the wordline WL (e.g., VSI<VWL) and the serial-gate transistor SGT is turned on (ON), the first gate signal G1 may be activated after the second gate signal G2 is activated. In other words, the activation time point of the second gate signal G2 may precede the activation time point of the first gate signal G1.

When the voltage VSI of the driving signal SI is lower than the voltage VWL of the wordline WL (e.g., VSI<VWL) and the serial-gate transistor SGT is turned off (OFF), the voltage VG1 of the first gate signal G1 may be deactivated to be higher than the voltage VWL of the wordline WL (e.g., VG1>VWL) and the voltage VG2 of the second gate signal G2 may be deactivated to be higher than or equal to the voltage VG1 of the first gate signal G1 (e.g., VG2≥VG1).

In some embodiments, when the voltage VSI of the driving signal SI is lower than the voltage VWL of the wordline WL (e.g., VSI<VWL) and the serial-gate transistor SGT is turned off (OFF), the second gate signal G2 may be deactivated after the first gate signal G1 is deactivated. In other words, as described below with reference to FIG. 13A, the deactivation time point of the first block selection signal BLKWL1 corresponding to the first gate signal G1 may precede the deactivation time point of the second block selection signal BLKWL2 corresponding to the second gate signal G2.

As such, when the voltage VSI of the driving signal SI applied to the first source-drain region 210 is lower than the voltage VWL of the wordline WL connected to the second source-drain region 220, the portion including the first source-drain region 210, the first gate G1 and the central region CR 231 may function as the switching transistor and the portion including the central region CR 231, the second gate G2 and the second source-drain region 220 may function as the field relaxation transistor (FRT).

Even though the example embodiment of two gates G1 and G2 being disposed above the semiconductor substrate 100 corresponding to the gate region 230 is described with reference to FIGS. 2 and 3, example embodiments are not limited thereto. For example, according to example embodiments, three or more gates may be disposed above the semiconductor substrate 100 corresponding to the gate region 230. The three or more gates may be electrically disconnected from each other, and may be controlled independently by three different gate signals.

Figure 4:
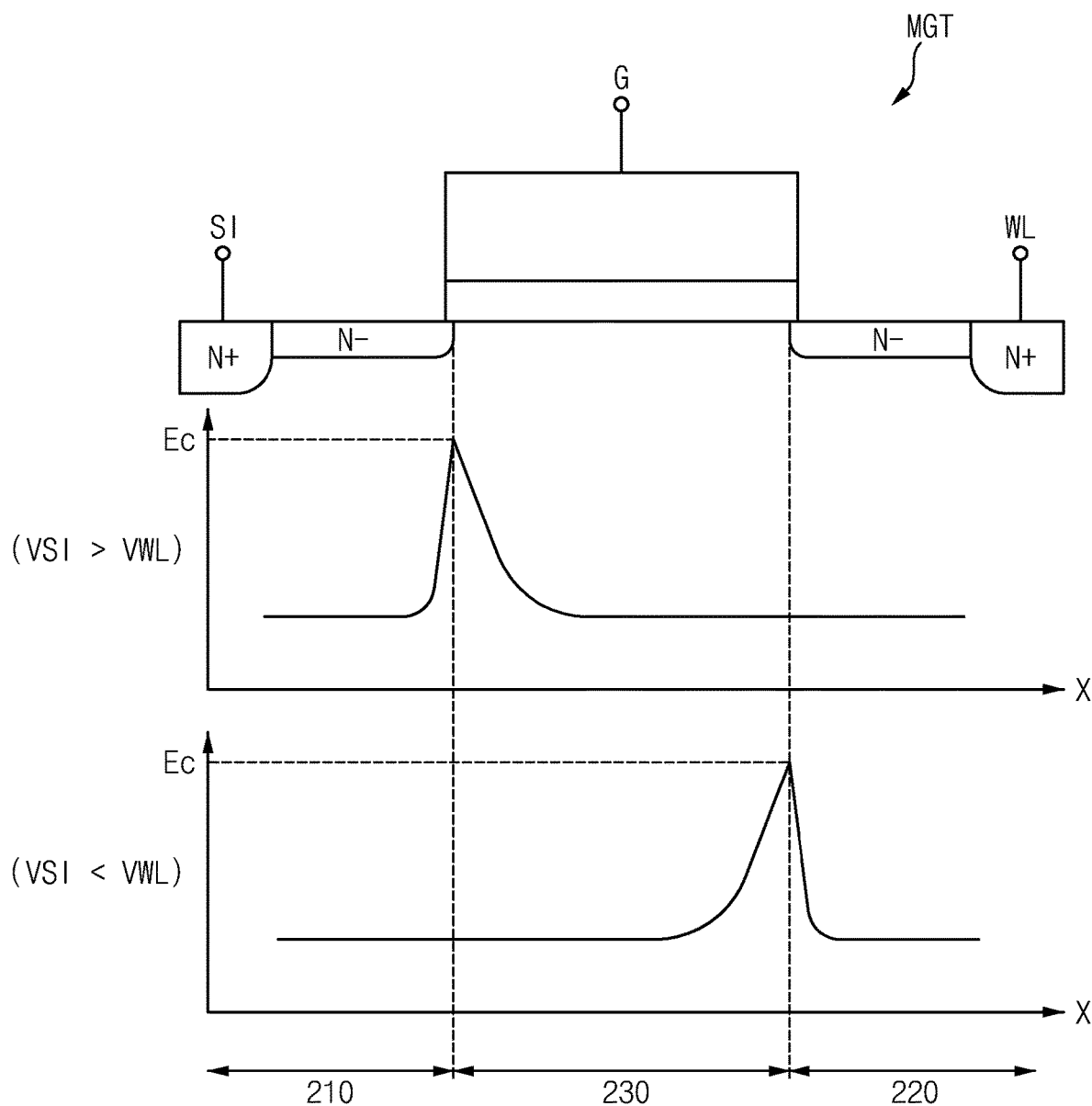
FIGS. 4 and 5 are diagrams illustrating reduction of a peak current of a serial-gate transistor, according to example embodiments.
Figure 5:
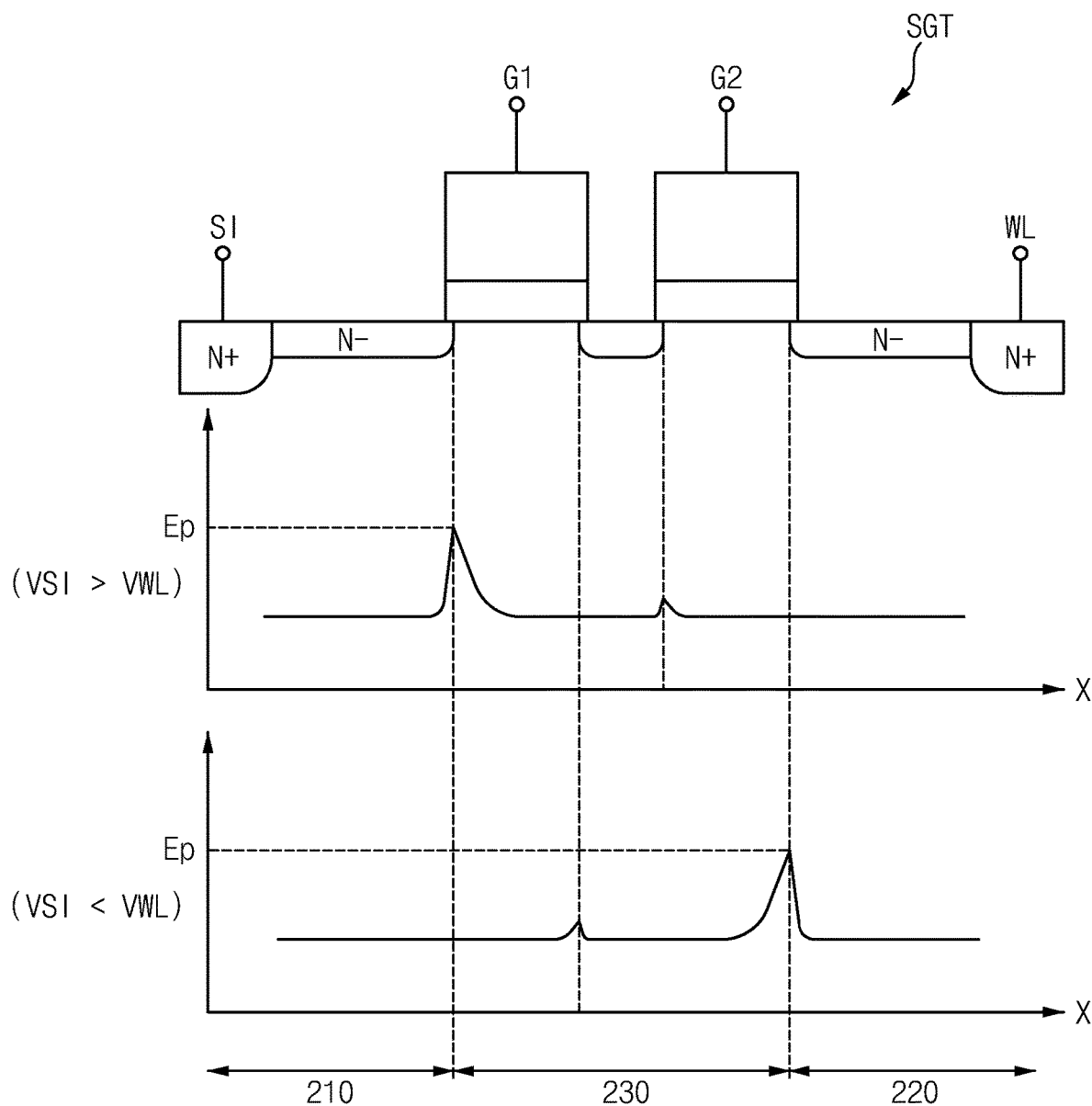

FIGS. 4 and 5 are diagrams illustrating reduction of a peak current of a serial-gate transistor, according to example embodiments.

FIG. 4 illustrates the distribution of the electric field of the mono-gate transistor MGT when the voltage VSI of the driving signal SI is higher than the voltage VWL of the wordline WL (e.g., VSI>VWL) and when the voltage VSI of the driving signal SI is lower than the voltage VWL of the wordline WL (e.g., VSI<VWL). FIG. 5 illustrates the distribution of the electric field of the serial-gate transistor SGT, according to example embodiments, when the voltage VSI of the driving signal SI is higher than the voltage VWL of the wordline WL (e.g., VSI>VWL) and when the voltage VSI of the driving signal SI is lower than the voltage VWL of the wordline WL (e.g., VSI<VWL).

In case of the mono-gate transistor MGT as illustrated in FIG. 4, the electric field may be concentrated in the boundary region between one gate and one source-drain region, and thus, the peak electric field Ec may be relatively high. Alternatively or additionally, in case of the serial-gate transistor SGT, according to example embodiments as illustrated in FIG. 5, the electric field may be distributed in the boundary region between one gate and one source-drain region corresponding to the drain of the field relaxation transistor and the boundary region between the other gate and the other source-drain region corresponding to the drain of the switching transistor, and thus, the peak electric field Ep may be reduced to be relatively low (e.g., when compared to peak electric field Ec). Here, one source-drain region corresponding to the source of the serial-gate transistor SGT, one gate and the central region CR 231 may function as the field relaxation transistor (FRT), and the other sour-drain region corresponding to the drain of the serial-gate transistor SGT, the other gate and the central region CR 231 may function as the switching transistor.

As such, the length of the channel in the horizontal direction X may be reduced and the area of the serial-gate transistor SGT and the nonvolatile memory device including the serial-gate transistor SGT may be reduced, by decreasing the junction breakdown voltage, the tunneling current, the gate induced drain leakage (GIDL) current and the hot carrier injection through the reduction of the peak electric field.

Figure 6:
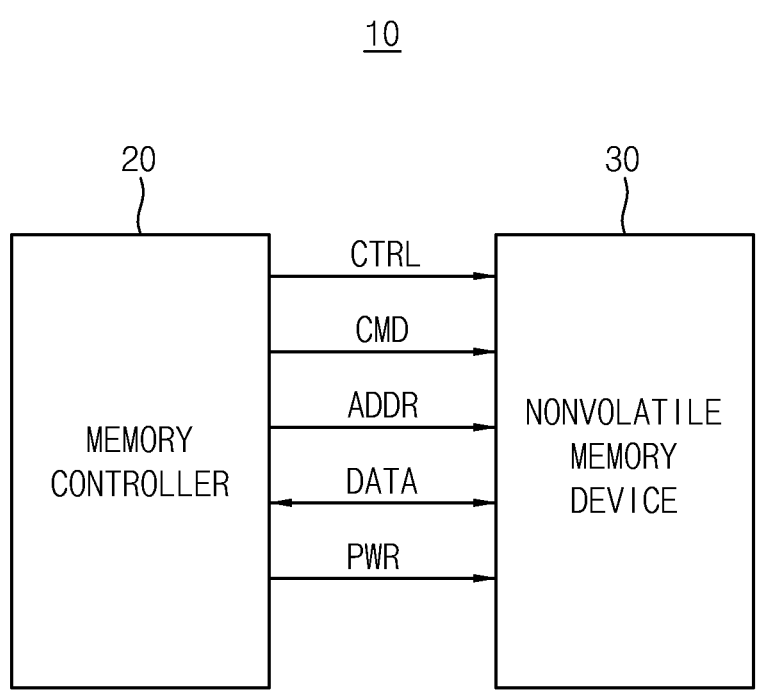
FIG. 6 is a block diagram illustrating a memory system, according to example embodiments.

FIG. 6 is a block diagram illustrating a memory system, according to example embodiments.

Referring to FIG. 6, a memory system 10 may include a memory controller 20 and at least one memory device 30. The memory device 30 may be a nonvolatile memory device as described herein. The memory system 10 may include data storage media based on a flash memory such as, but not limited to, a memory card, a universal serial bus (USB) memory, and a solid state drive (SSD).

The nonvolatile memory device 30 may perform one or more operations under control of the memory controller 20. The one or more operations may include, but not be limited to, a read operation, an erase operation, a program operation, and a write operation. The nonvolatile memory device 30 may receive a command CMD (e.g., a read command and/or a write command), an address ADDR (e.g., a read address and/or a write address) and data DATA through input/output lines from the memory controller 20 for performing such operations. Alternatively or additionally, the nonvolatile memory device 30 may receive a control signal CTRL through a control line from the memory controller 20. In some embodiments, the nonvolatile memory device 30 may receive a power PWR through a power line from the memory controller 20.

Figure 7:
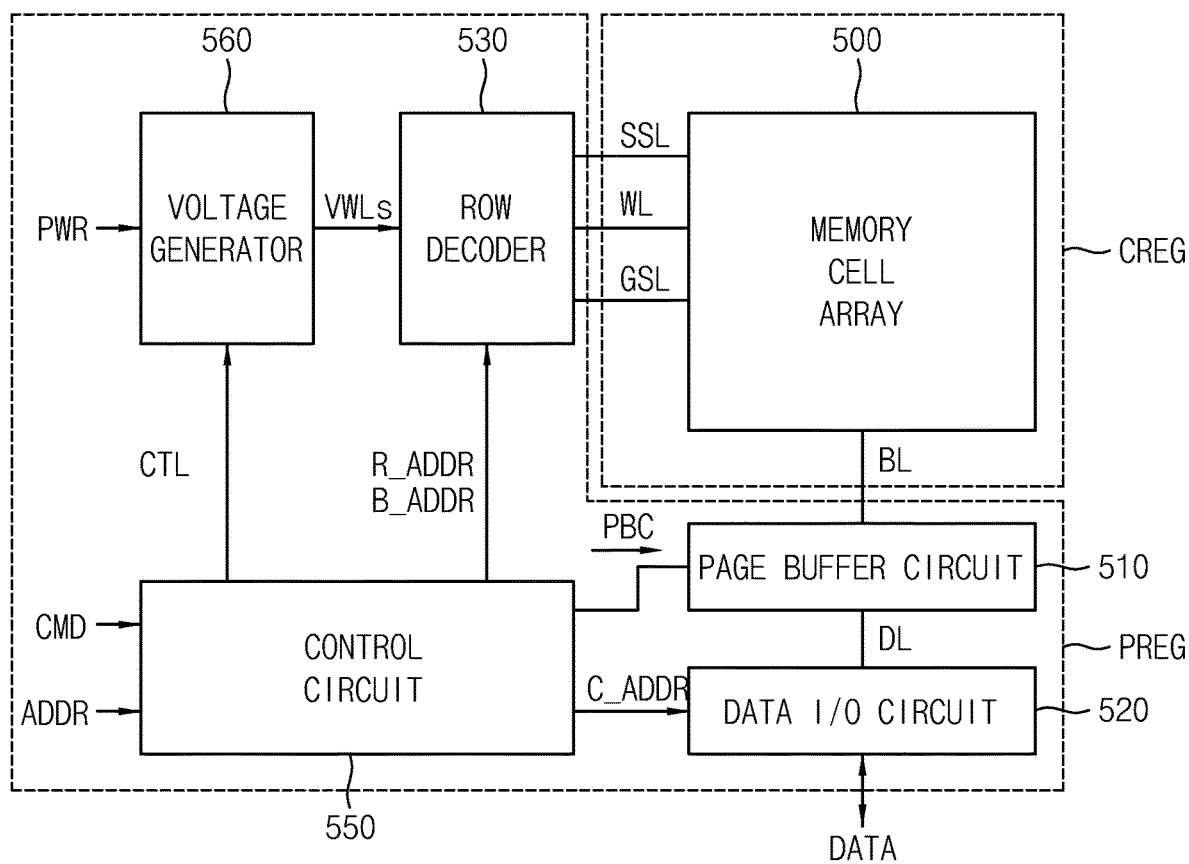
FIG. 7 is a block diagram illustrating a nonvolatile memory device, according to example embodiments.

FIG. 7 is a block diagram illustrating a nonvolatile memory device, according to example embodiments.

Referring to FIG. 7, a nonvolatile memory device 1000 may include a memory cell array 500, a page buffer circuit 510, a data input/output (I/O) circuit 520, a row decoder 530, a control circuit 550 and a voltage generator 560. In some embodiments, the memory cell array 500 may be disposed in a cell region (e.g., cell region CREG in FIG. 16), and the page buffer circuit 510, the data I/O circuit 520, the row decoder 530, the control circuit 550 and the voltage generator 560 may be disposed in a peripheral region (e.g., peripheral region PREG in FIG. 16).

The memory cell array 500 may be coupled to the row decoder 530 through string selection lines SSL, wordlines WL, and ground selection lines GSL. Alternatively or additionally, the memory cell array 500 may be coupled to the page buffer circuit 510 through bitlines BL. The memory cell array 500 may include a plurality of memory blocks and each memory block may include memory cells coupled to the wordlines WL and the bitlines BL. In some example embodiments, the memory cell array 500 may be a three-dimensional memory cell array, which is formed on a substrate in a three-dimensional structure (e.g., a vertical structure). For example, the memory cell array 500 may include cell strings (e.g., NAND strings) that are vertically oriented such that at least one memory cell is overlapped vertically with another memory cell.

The control circuit 550 may receive a command CMD (e.g., a command signal) and an address ADDR (e.g., an address signal) from a memory controller (e.g., memory controller 20 of FIG. 6). Accordingly, the control circuit 550 may control erase, program, and/or read operations of the nonvolatile memory device 1000 in response to (and/or based on) at least one of the command signal CMD and the address signal ADDR. An erase operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 550 may generate the control signals CTL used to control the operation of the voltage generator 560, and may generate the page buffer control signal PBC for controlling the page buffer circuit 510 based on the command signal CMD. Alternatively or additionally, the control circuit 550 may generate the block address B_ADDR, the row address R_ADDR and the column address C_ADDR based on the address signal ADDR. The control circuit 550 may provide the block address B_ADDR and the row address R_ADDR to the row decoder 530 and provide the column address C_ADDR to the data I/O circuit 520.

The row decoder 530 may be coupled to the memory cell array 500 through the string selection lines SSL, the wordlines WL, and the ground selection lines GSL. During the program operation and/or the read operation, the row decoder 530 may determine and/or select one of the wordlines WL as a selected wordline and determine the remaining wordlines WL except for the selected wordline as unselected wordlines based on the row address R_ADDR.

During the program operation and/or the read operation, the row decoder may determine one of the plurality of memory blocks as a selected memory block and the other memory blocks as unselected memory blocks based on the block address B_ADDR provided from the control circuit 550. Alternatively or additionally, the row decoder 530 may determine one of the string selection lines SSL as a selected string selection line and determine rest of the string selection lines SSL except for the selected string selection line as unselected string selection lines based on the row address R_ADDR.

The voltage generator 560 may generate wordline voltages VWL, which may be required for the operation of the memory cell array 500 of the nonvolatile memory device 1000, based on the control signals CTL. The voltage generator 560 may receive power PWR from the memory controller. The wordline voltages VWL may be applied to the wordlines WL through the row decoder 530.

For example, during the erase operation, the voltage generator 560 may apply an erase voltage to a well and/or a common source line of a memory block and apply an erase permission voltage (e.g., a ground voltage) to all or a portion of the wordlines of the selected memory block based on an erase address. During the erase verification operation, the voltage generator 560 may apply an erase verification voltage simultaneously to all of the wordlines of the selected memory block or sequentially (e.g., one by one) to the wordlines.

For another example, during the program operation, the voltage generator 560 may apply a program voltage to the selected wordline and may apply a program pass voltage to the unselected wordlines. In addition, during the program verification operation, the voltage generator 560 may apply a program verification voltage to the first wordline and may apply a verification pass voltage to the unselected wordlines.

During the normal read operation, the voltage generator 560 may apply a read voltage to the selected wordline and may apply a read pass voltage to the unselected wordlines. During the data recover read operation, the voltage generator 560 may apply the read voltage to a wordline adjacent to the selected wordline and may apply a recover read voltage to the selected wordline.

The page buffer circuit 510 may be coupled to the memory cell array 500 through the bitlines BL. The page buffer circuit 510 may include multiple buffers. In some example embodiments, each buffer may be connected to a single bitline. Alternatively or additionally, each buffer may be connected to two or more bitlines. The page buffer circuit 510 may temporarily store data to be programmed in a selected page or data read out from the selected page of the memory cell array 500.

The data I/O circuit 520 may be coupled to the page buffer circuit 510 through data lines DL. During the program operation, the data I/O circuit 520 may receive program data DATA received from the memory controller and provide the program data DATA to the page buffer circuit 510 based on the column address C_ADDR received from the control circuit 550. During the read operation, the data I/O circuit 520 may provide read data DATA, having been read from the memory cell array 500 and stored in the page buffer circuit 510, to the memory controller based on the column address C_ADDR received from the control circuit 550.

In some embodiments, the page buffer circuit 510 and the data I/O circuit 520 may read data from a first area of the memory cell array 500 and write the read data to a second area of the memory cell array 500 (e.g., without transmitting the data to a source external to the nonvolatile memory device 1000, such as to the memory controller 20 of FIG. 6). For example, the page buffer circuit 510 and the data I/O circuit 520 may perform a copy-back operation.

Figure 8:
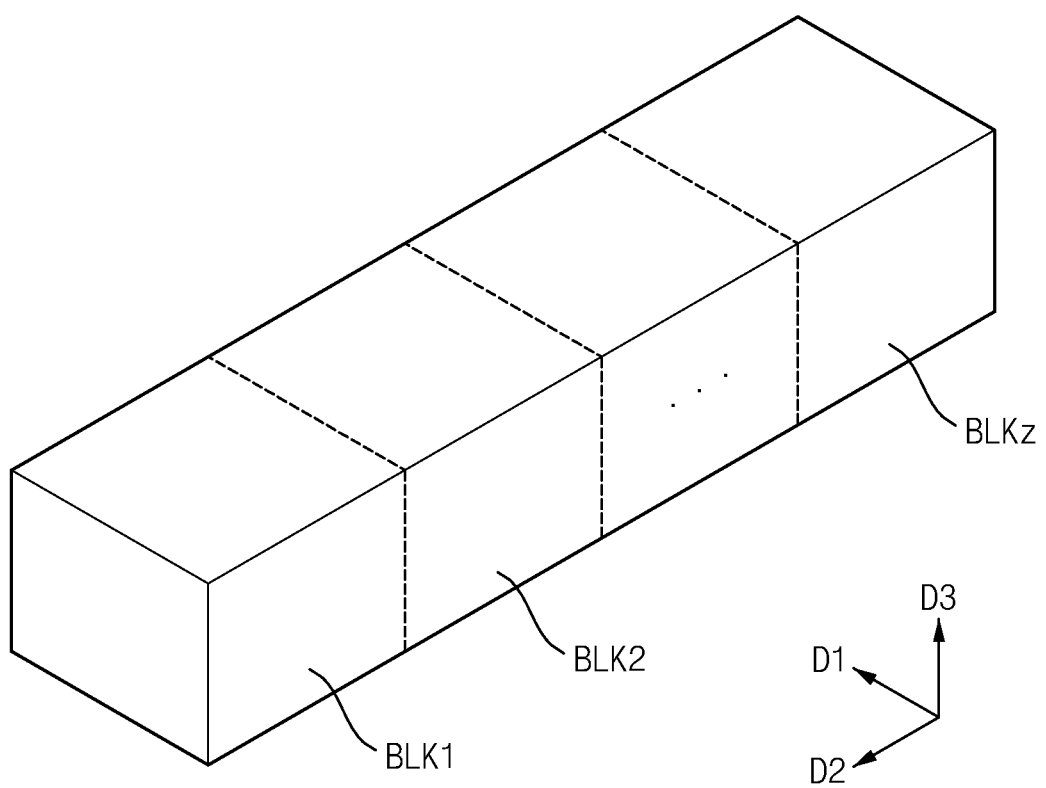
FIG. 8 is a block diagram illustrating a memory cell array included in the nonvolatile memory device of FIG. 7, according to example embodiments.
Figure 9:
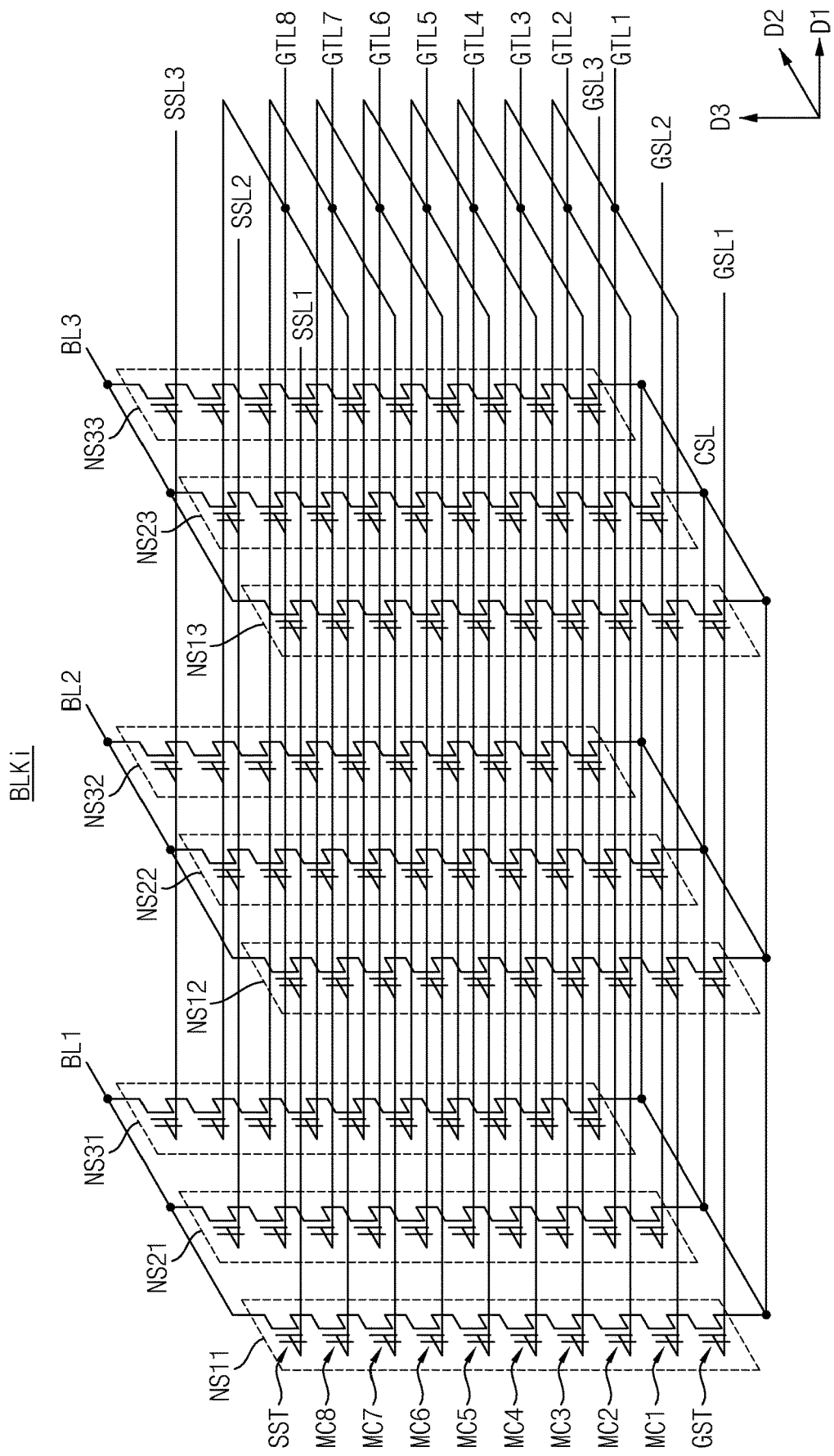
FIG. 9 is a circuit diagram illustrating an equivalent circuit of a memory block included in the memory cell array of FIG. 8, according to example embodiments.

FIG. 8 is a block diagram illustrating a memory cell array included in the nonvolatile memory device of FIG. 7, according to example embodiments. FIG. 9 is a circuit diagram illustrating an equivalent circuit of a memory block included in the memory cell array of FIG. 8, according to example embodiments.

Referring to FIG. 8, the memory cell array 500 may include memory blocks BLK1 to BLKz, where z is an integer greater than 1. In some example embodiments, the memory blocks BLK1 to BLKz may be selected by the row decoder 530 of FIG. 7. For example, the row decoder 530 may select a particular memory block corresponding to a block address B_ADDR as the selected memory block among the memory blocks BLK1 to BLKz.

The memory block BLKi of FIG. 9 (where i is an integer between 1 and z) may be formed on a semiconductor substrate in a three-dimensional structure (e.g., a vertical structure). For example, NAND strings and/or cell strings included in the memory block BLKi may be disposed in the vertical direction D3 perpendicular to the upper surface of the substrate.

Referring to FIG. 9, the memory block BLKi may include cell strings and/or NAND strings NS11 to NS33 coupled between bitlines BL1, BL2 and BL3 and a common source line CSL. Each NAND string may include a plurality of memory cells stacked in the vertical direction D3, and the plurality of wordlines may be stacked in the vertical direction D3.

Each of the NAND strings NS11 to NS33 may include a string selection transistor SST, memory cells MC1 to MC8, and a ground selection transistor GST. In FIG. 9, each of the NAND strings NS11 to NS33 is illustrated to include eight memory cells MC1 to MC8.

However, the present disclosure is not limited in this regard. For example, in some embodiments, each of the NAND strings NS11 to NS33 may include any number of memory cells.

Each string selection transistor SST may be connected (e.g., communicatively coupled) to a corresponding string selection line (e.g., one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (e.g., one of GSL1 to GSL3). Each string selection transistor SST may be connected to a corresponding bitline (e.g., one of BL1, BL2 and BL3), and each ground selection transistor GST may be connected to the common source line CSL.

The wordline (e.g., each of the gate lines GTL1 to GTL8) having the same height may be commonly connected, and the ground selection lines GSL1 to GSL3 and the string selection lines SSL1 to SSL3 may be separated. In FIG. 9, the memory block BLKi is illustrated to be coupled to eight gate lines GTL1 to GTL8 and three bitlines BL1 to BL3. However, the present disclosure is not limited in this regard. Each memory block in the memory cell array 500 may be coupled to any number of wordlines and any number of bitlines.

Figure 10:
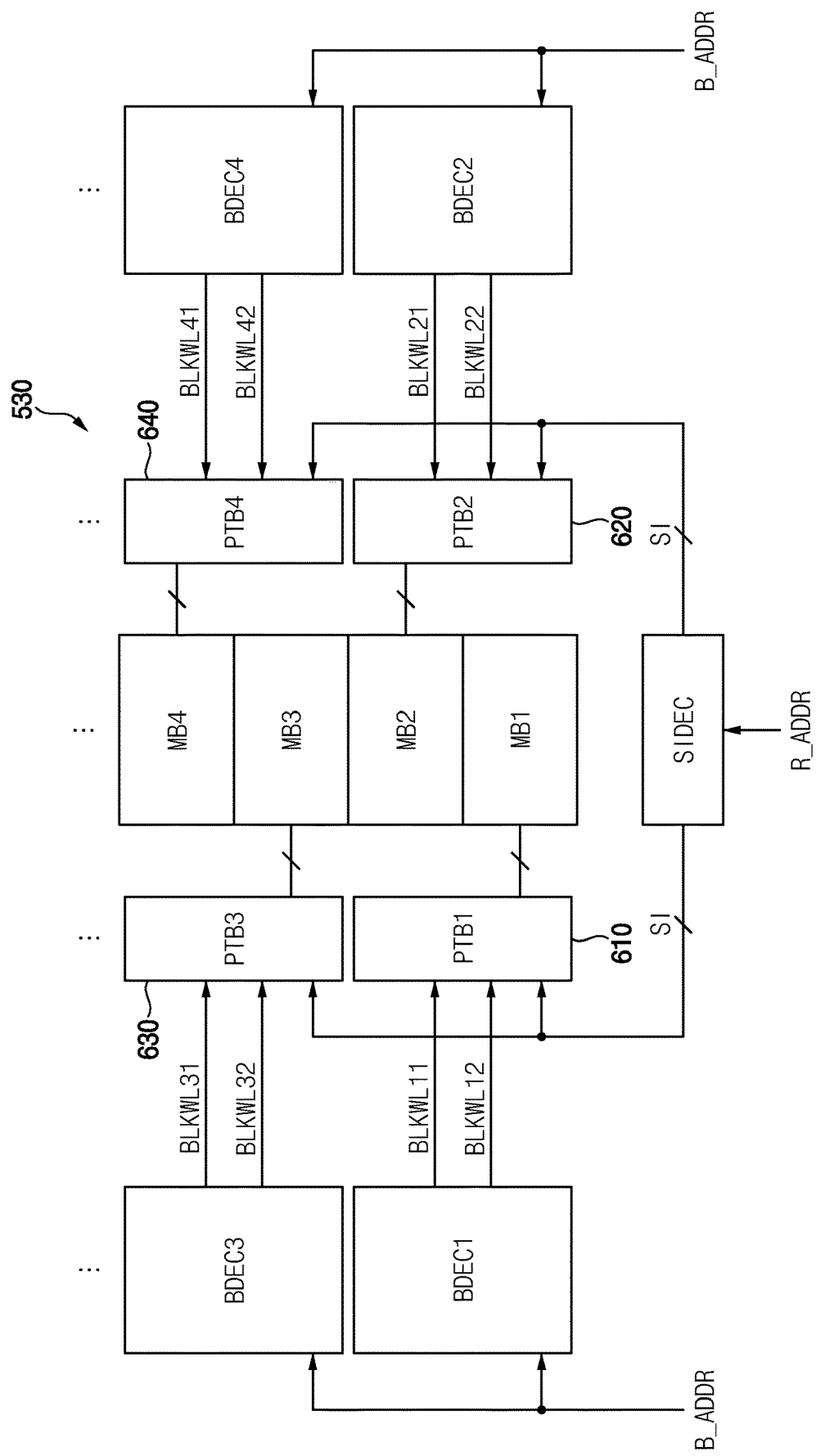
FIG. 10 is a block diagram illustrating an example embodiment of a row decoder included in a nonvolatile memory device, according to example embodiments.

FIG. 10 is a block diagram illustrating an example embodiment of a row decoder included in a nonvolatile memory device, according to example embodiments. FIG. 10 illustrates four memory blocks, that is, first through fourth memory blocks (e.g., MB1-MB4) and a corresponding configuration of the row decoder 530 for convenience of illustration and description. However, the present disclosure is not limited to a particular number of memory blocks.

Referring to FIG. 10, the row decoder 530 may include a driving signal decoder SIDEC, first through fourth block decoders (e.g., BDEC1-BDEC4), and first through fourth pass transistor blocks (e.g., PTB1-PTB4, 610, 620, 630 and 640) corresponding to the first through fourth memory blocks MB1-MB4.

The driving signal decoder SIDEC may generate driving signals SI based on the row address R_ADDR. The driving signal decoder SIDEC may determine voltage levels of the driving signals SI corresponding to the program operation, the read operation, and/or the erase operation.

The first through fourth block decoders BDEC1-BDEC4 may generate block selection signals to select one memory block based on the block address B_ADDR.

The first block decoder BDEC1 may generate a pair of block selection signals BLKWL11 and BLKWL12 corresponding to the first memory block MB1. The second block decoder BDEC2 may generate a pair of block selection signals BLKWL21 and BLKWL22 corresponding to the second memory block MB2. The third block decoder BDEC3 may generate a pair of block selection signals BLKWL31 and BLKWL32 corresponding to the third memory block MB3. The fourth block decoder BDEC4 may generate a pair of block selection signals BLKWL41 and BLKWL42 corresponding to the fourth memory block MB4.

The first through fourth pass transistor blocks 610, 620, 630 and 640 may control transfer of the driving signals SI to the corresponding memory block based on the corresponding pair of block selection signals.

The first pass transistor block 610 may control the transfer of the driving signals SI to the first memory block MB1 based on the pair of block selection signals BLKWL11 and BLKWL12. The second pass transistor block 620 may control the transfer of the driving signals SI to the second memory block MB2 based on the pair of block selection signals BLKWL21 and BLKWL22. The third pass transistor block 630 may control the transfer of the driving signals SI to the third memory block MB3 based on the pair of block selection signals BLKWL31 and BLKWL32. The fourth pass transistor block 640 may control the transfer of the driving signals SI to the fourth memory block MB4 based on the pair of block selection signals BLKWL41 and BLKWL42.

Figure 11:
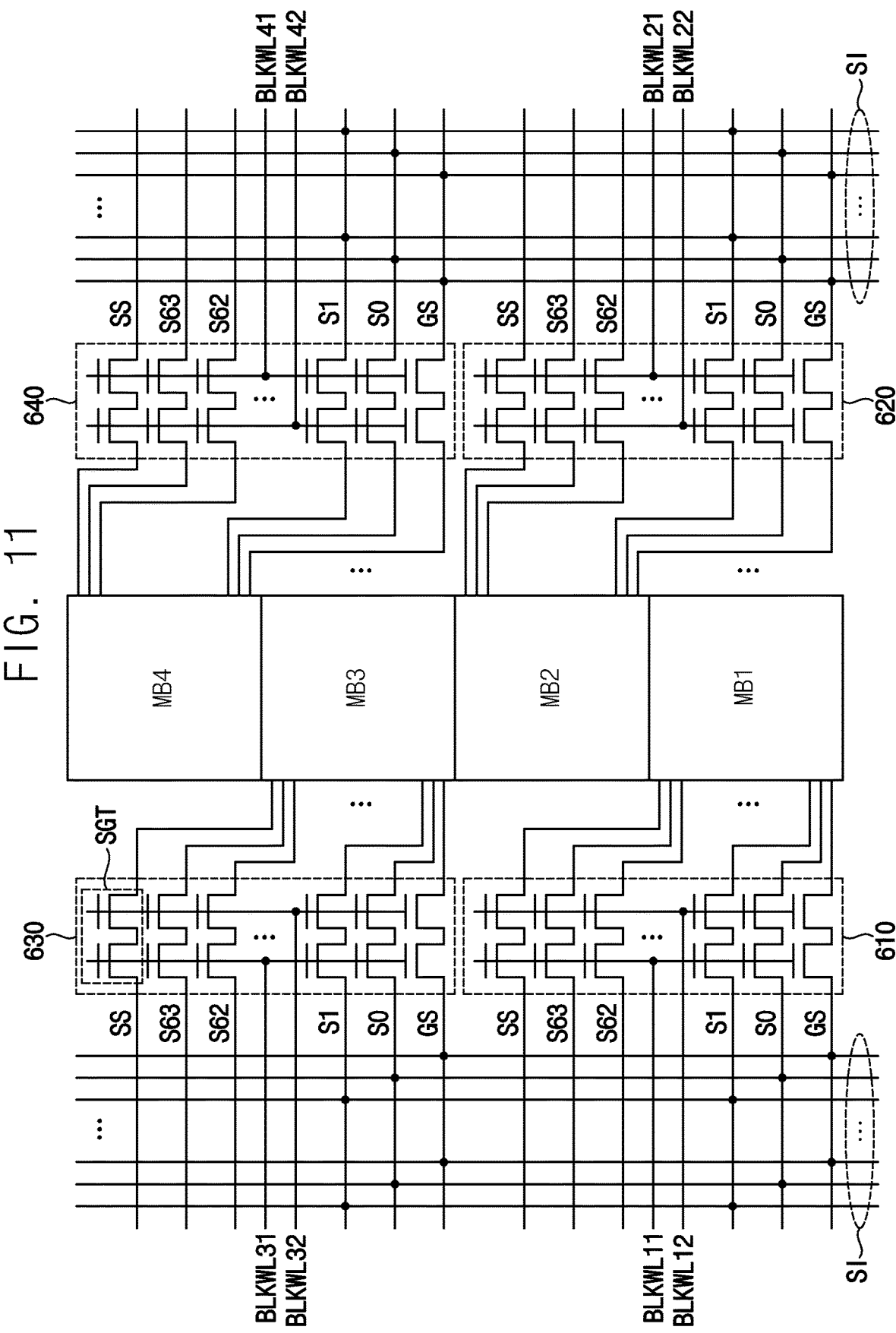
FIG. 11 is a diagram illustrating a portion of the row decoder of FIG. 10, according to example embodiments.

FIG. 11 is a diagram illustrating a portion of the row decoder of FIG. 10, according to example embodiments.

Referring to FIG. 11, the driving signals SI may be transferred selectively to the first through fourth memory blocks MB1-MB4 by the first through fourth pass transistor blocks 610, 620, 630 and 640.

When the first memory block MB1 is selected based on the block address, the pair of block selection signals BLKWL11 and BLKWL12 provided from the first block decoder BDEC1 may be activated such that the pass transistors (e.g., 610-640) and/or the serial-gate transistors SGT in the first pass transistor block 610 may be turned on. Accordingly, the driving signals SI (including a ground selection signal GS), a string selection signal SS, and wordline driving signals S0-S63 may be transferred to the first memory block MB1. The driving signals GS, SS, and S0-S63 may be provided to the gates (e.g., the wordlines) of the selection transistors and the memory cells in the first memory block MB1.

When the second memory block MB2 is selected based on the block address, the pair of block selection signals BLKWL21 and BLKWL22 provided from the second block decoder BDEC2 may be activated such that the serial-gate transistors SGT in the second pass transistor block 620 may be turned on. Accordingly, the driving signals GS, SS, and S0-S63 may be transferred to the second memory block MB2. The driving signals GS, SS, and S0-S63 may be provided to the gates of the selection transistors and the memory cells in the second memory block MB2.

When the third memory block MB3 is selected based on the block address, the pair of block selection signals BLKWL31 and BLKWL32 provided from the third block decoder BDEC3 may be activated such that the serial-gate transistors SGT in the third pass transistor block 630 may be turned on. Accordingly, the driving signals GS, SS, and S0-S63 may be transferred to the third memory block MB3. The driving signals GS, SS, and S0-S63 may be provided to the gates of the selection transistors and the memory cells in the third memory block MB3.

When the fourth memory block MB4 is selected based on the block address, the pair of block selection signals BLKWL41 and BLKWL42 provided from the fourth block decoder BDEC4 may be activated such that the serial-gate transistors SGT in the fourth pass transistor block 640 may be turned on. Accordingly, the driving signals GS, SS, and S0-S63 may be transferred to the fourth memory block MB4. The driving signals GS, SS, and S0-S63 may be provided to the gates of the selection transistors and the memory cells in the fourth memory block MB4.

As illustrated in FIG. 11, each of the first through fourth pass transistor blocks 610, 620, 630 and 640 may include a plurality of serial-gate transistors SGT. One of the pair of the block selection signals may correspond to the above-described first gate signal G1 and the other of the pair of the block selection signals may correspond to the above-described second gate signal G2. In the configuration of FIG. 11, each of the block selection signals BLKWL11, BLKWL21, BLKWL31 and BLKWL41 may correspond to the first gate signal G1 and each of the block selection signals BLKWL12, BLKWL22, BLKWL32 and BLKWL42 may correspond to the second gate signal G2. Accordingly, the operation of each serial-gate transistor SGT may be described as follows.

Referring to FIGS. 2, 3, 10 and 11, when a voltage VSI of the driving signal SI applied to the first source-drain region 210 is higher than a voltage VWL of the wordline WL connected to the second source-drain region 220 (e.g., VSI>VWL) and the serial-gate transistor SGT is turned on (ON), a voltage VG1 of the first block selection signal BLKWLi1 (where i={1, 2, 3, 4}) may be activated to be higher than the voltage VSI of the driving signal SI and a voltage VG2 of the second block selection signal BLKWLi2 may be activated to be lower than or equal to the voltage VG1 of the first block selection signal BLKWLi1.

Alternatively or additionally, when the voltage VSI of the driving signal SI applied to the first source-drain region 210 is higher than the voltage VWL of the wordline WL connected to the second source-drain region 220 (e.g., VSI>VWL) and the serial-gate transistor SGT is turned on (ON), the second block selection signal BLKWLi2 may be activated after the first block selection signal BLKWLi1 is activated. In other words, as described below with reference to FIG. 13A, the activation time point of the first block selection signal BLKWLi1 may precede the activation time point of the second block selection signal BLKWLi2.

When the voltage VSI of the driving signal SI is higher than the voltage VWL of the wordline WL (e.g., VSI>VWL) and the serial-gate transistor SGT is turned off (OFF), the voltage VG2 of the second block selection signal BLKWLi2 may be deactivated to be lower than the voltage VSI of the driving signal SI and the voltage VG1 of the first block selection signal BLKWLi1 may be deactivated to be higher than or equal to the voltage VG2 of the second block selection signal BLKWLi2.

Alternatively or additionally, when the voltage VSI of the driving signal SI is higher than the voltage VWL of the wordline WL (e.g., VSI>VWL) and the serial-gate transistor SGT is turned off (OFF), the first block selection signal BLKWLi1 may be deactivated after the second block selection signal BLKWLi2 is deactivated. In other words, the deactivation time point of the first block selection signal BLKWLi1 may lag behind the deactivation time point of the second block selection signal BLKWLi2.

When the voltage VSI of the driving signal SI applied to the first source-drain region 210 is lower than a voltage VWL of the wordline WL connected to the second source-drain region 220 (e.g., VSI<VWL) and the serial-gate transistor SGT is turned on (ON), the voltage VG2 of the second block selection signal BLKWLi2 may be activated to be higher than the voltage VWL of the wordline WL and the voltage VG1 of the first block selection signal BLKWLi1 may be activated to be lower than or equal to the voltage VG2 of the second block selection signal BLKWLi2.

Alternatively or additionally, when the voltage VSI of the driving signal SI is lower than the voltage VWL of the wordline WL (e.g., VSI<VWL) and the serial-gate transistor SGT is turned on (ON), the first block selection signal BLKWLi1 may be activated after the second block selection signal BLKWLi2 is activated. In other words, the activation time point of the second block selection signal BLKWLi2 may precede the activation time point of the first block selection signal BLKWLi1.

When the voltage VSI of the driving signal SI is lower than the voltage VWL of the wordline WL (e.g., VSI<VWL) and the serial-gate transistor SGT is turned off (OFF), the voltage VG1 of the first block selection signal BLKWLi1 may be deactivated to be higher than the voltage VWL of the wordline WL and the voltage VG2 of the second block selection signal BLKWLi2 may be deactivated to be higher than or equal to the voltage VG1 of the first block selection signal BLKWLi1.

Alternatively or additionally, when the voltage VSI of the driving signal SI is lower than the voltage VWL of the wordline WL (e.g., VSI<VWL) and the serial-gate transistor SGT is turned off (OFF), the second block selection signal BLKWLi2 may be deactivated after the first block selection signal BLKWLi1 is deactivated. In other words, as described below with reference to FIG. 13A, the deactivation time point of the first block selection signal BLKWLi1 may precede the deactivation time point of the second block selection signal BLKWLi2.

Figure 12B:
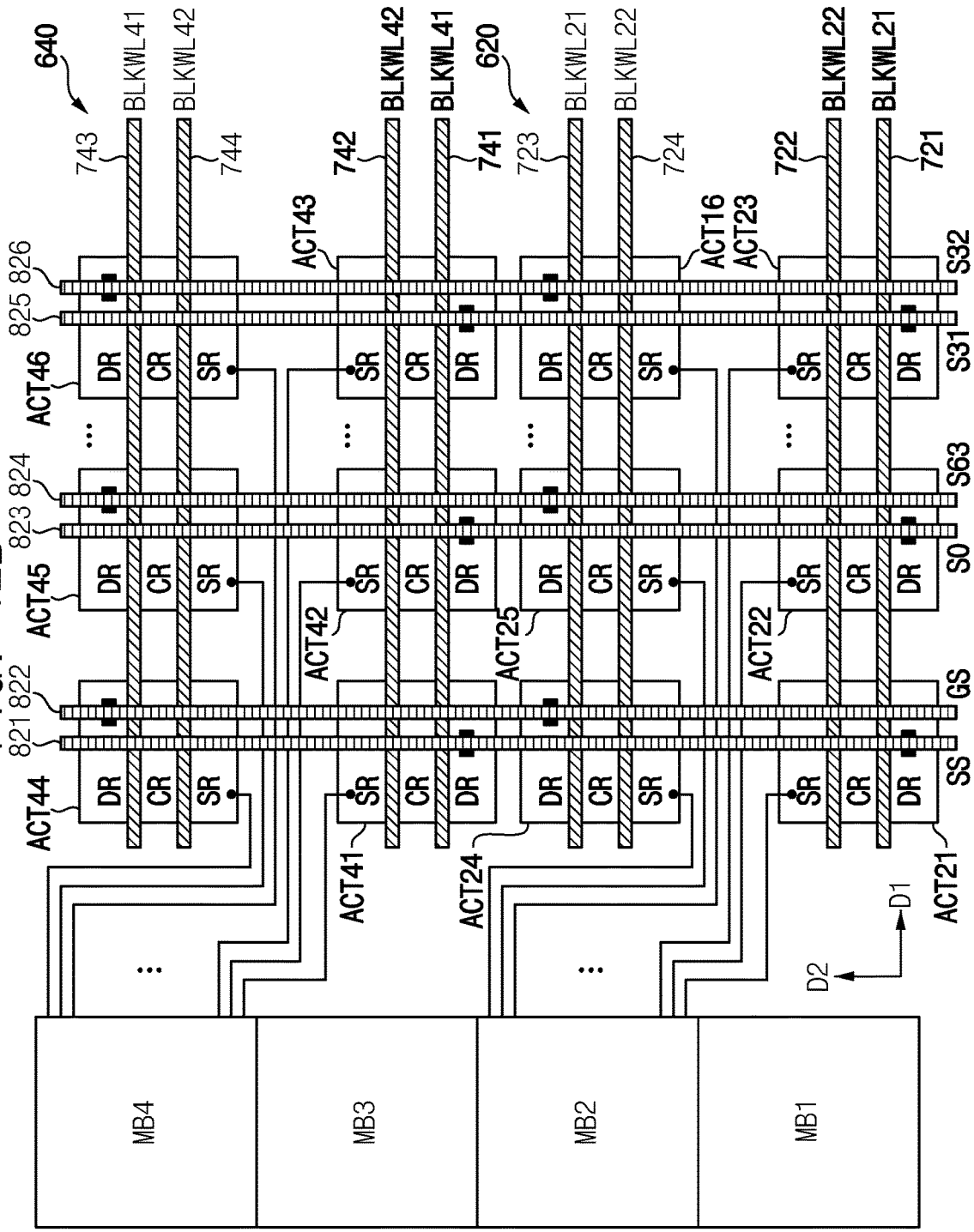

FIGS. 12A and 12B are diagrams illustrating example embodiments of layout of pass transistor blocks included in the row decoder of FIG. 10, according to example embodiments.

Referring to FIGS. 12A and 12B, active regions ACT11-ACT16 may correspond to the serial-gate transistors SGT included in the first pass transistor block 610, active regions ACT21-ACT26 may correspond to the serial-gate transistors SGT included in the second pass transistor block 620, active regions ACT31-ACT36 may correspond to the serial-gate transistors SGT included in the third pass transistor block 630, and active regions ACT11-ACT16 may correspond to the serial-gate transistors SGT included in the fourth pass transistor block 640.

As described above with reference to FIG. 2, each active region corresponding to each serial-gate transistor SGT may include a first source-drain region DR (e.g., first source-drain region 210 of FIG. 2), a central region CR (e.g., central regions 231 in FIG. 2) and a second source-drain region SR (e.g., second source-drain region 220 in FIG. 2) that are sequentially arranged in the horizontal direction D2 (e.g., direction X of FIG. 2).

As illustrated in FIGS. 12A and 12B, the memory blocks MB1-MB4 may be arranged in a column direction D2. Alternatively or additionally, the plurality of serial-gate transistors included in each pass transistor block may be arranged in a matrix of rows and columns, Two gate lines forming the first gate G1 and the second gate G2, as illustrated in FIG. 2, may be disposed with respect to each row of the serial-gate transistors SGT such that the two gate lines extend in a row direction D1 and arranged in a column direction D2.

As illustrated in FIG. 12A, the two gate lines 711 and 712 may be disposed in the row of active regions ACT11, ACT12 and ACT13, the two gate lines 713 and 714 may be disposed in the row of active regions ACT14, ACT15 and ACT16, the two gate lines 731 and 732 may be disposed in the row of active regions ACT31, ACT32 and ACT33, and the two gate lines 733 and 734 may be disposed in the row of active regions ACT34, ACT35 and ACT36.

As illustrated in FIG. 12B, the two gate lines 721 and 722 may be disposed in the row of active regions ACT21, ACT22 and ACT23, the two gate lines 723 and 724 may be disposed in the row of active regions ACT24, ACT25 and ACT26, the two gate lines 741 and 742 may be disposed in the row of active regions ACT41, ACT42 and ACT43, and the two gate lines 743 and 744 may be disposed in the row of active regions ACT44, ACT45 and ACT46.

The driving signals GS, SS, and S0-S63 may be applied to the first source-drain regions DR of the active regions through vertical contacts VC and metal lines 811-816 that extend in the column direction D2 and are arranged in the row direction D1.

In some example embodiments, a plurality of memory blocks may be arranged in the column direction D2 and the plurality of pass transistor blocks corresponding to the plurality of memory blocks may be disposed and distributed in both sides of the plurality of memory blocks in the row direction D1. For example, as illustrated in FIGS. 10 through 12B, the first pass transistor block 610 and the third pass transistor block 630 may be disposed in one side of the memory blocks MB1-MB4 in the row direction D1, and the second pass transistor block 620 and the fourth pass transistor block 640 may be disposed in the other side of the memory blocks MB1-MB4 in the row direction D1. Through such distribution of the pass transistor blocks, the layout of the row decoder may be designed efficiently and the area of the row decoder may be reduced, when compared to related semiconductor devices.

FIGS. 13A through 13E are diagrams illustrating operations of a serial-gate transistor included in a pass transistor block in a program operation of a nonvolatile memory device, according to example embodiments.

In a program operation, a plurality of serial-gate transistors included in a selected pass transistor block corresponding to a selected memory block may be turned on and a plurality of serial-gate transistors included in an unselected pass transistor block corresponding to an unselected memory block may maintain a turned-off state.

Figure 13A:
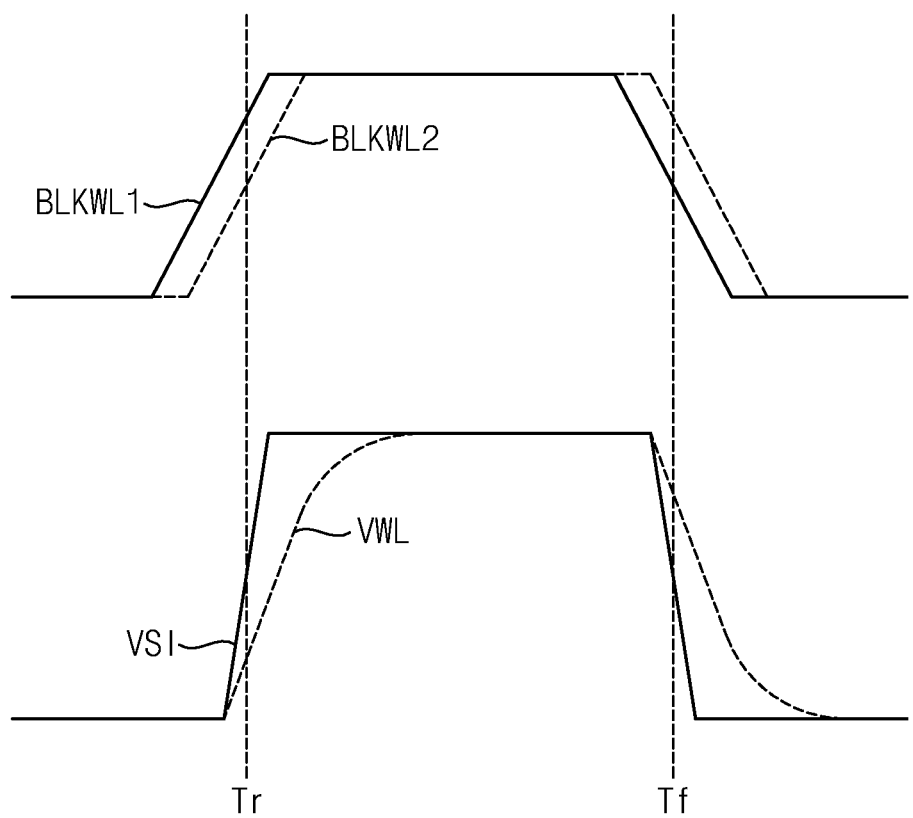
FIGS. 13A through 13E are diagrams illustrating operations of a serial-gate transistor included in a pass transistor block in a program operation of a nonvolatile memory device, according to example embodiments.

FIG. 13A illustrates example timings and waveforms of a voltage VSI of a driving signal SI applied to a first source-drain region 210, a voltage VWL of a wordline WL connected to a second source-drain region 220, a first block selection signal BLKW1 applied to a first gate G1 and a second block selection signal BLKW2 applied to a second gate G2, with respect to a selected pass transistor block in the program operation.

Figure 13B:
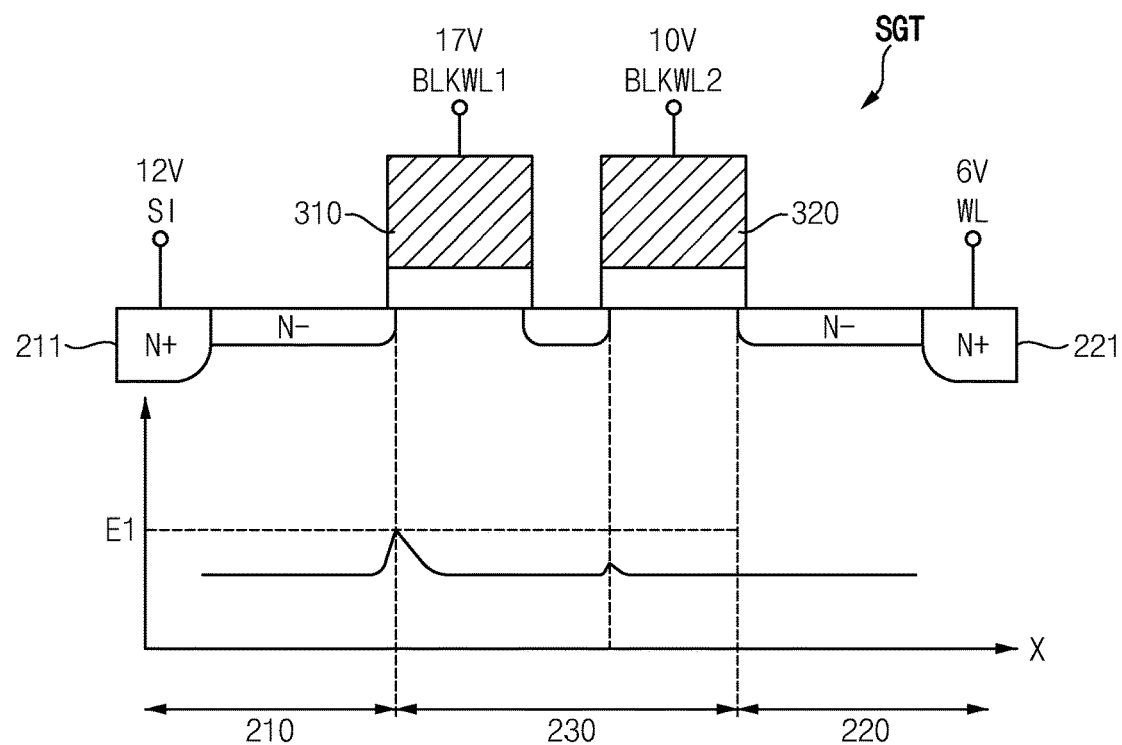
Figure 13C:
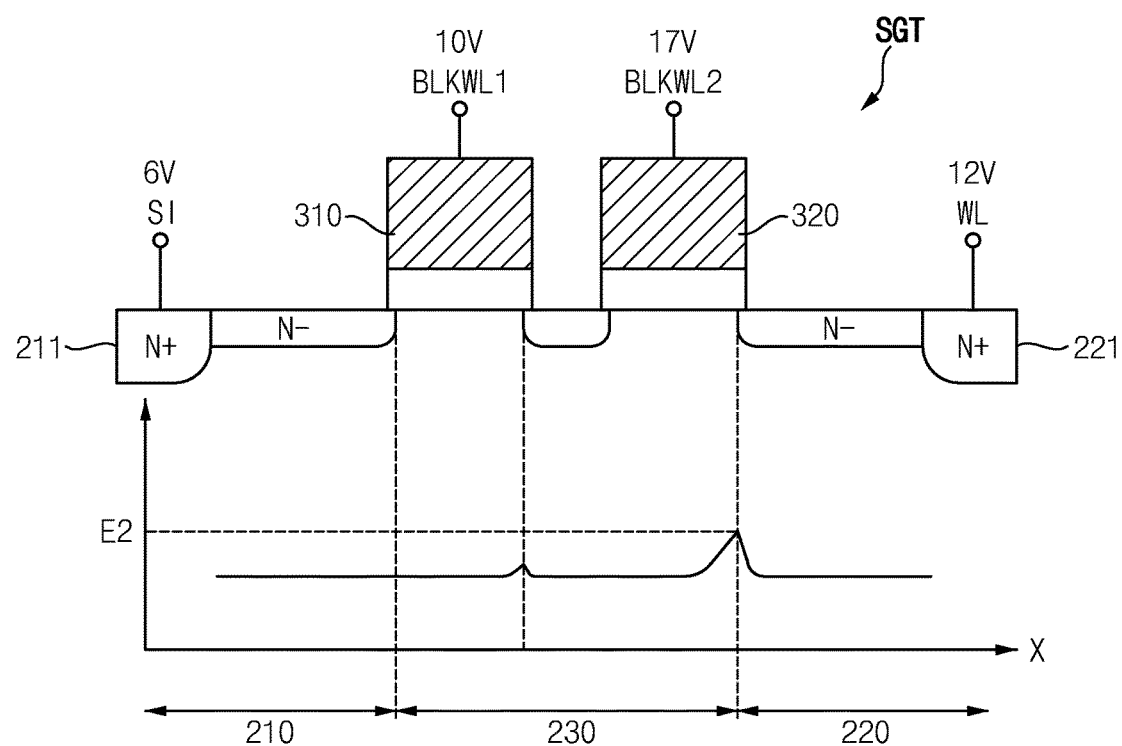

FIGS. 13B and 13C illustrate example distributions of electric fields along the horizontal direction X and example voltage levels of the driving signal SI, the wordline WL, the first block selection signal BLKWL1 and the second block selection signal BLKWL2, with respect to the selected pass transistor block in the program operation. FIG. 13B illustrates a period when the voltage VSI of the driving signal SI is increased in the program operation, for example, corresponding to the time point Tr in FIG. 13A. FIG. 13C illustrates a period when the voltage VSI of the driving signal SI is decreased in the program operation, for example, corresponding to the time point Tf in FIG. 13A.

Referring to FIGS. 13A, 13B and 13C, while the voltage VSI of the driving signal SI is increased in the program operation, the serial-gate transistor SGT in the selected pass transistor block may be turned on and the voltage VSI of the driving signal SI may be higher than the voltage VWL of the wordline WL. In this case, for example, at the time point Tr, the voltage of the first block selection signal BLKWL1 applied to the selected pass transistor block may be activated to be higher than the voltage VSI of the driving signal SI and the voltage of the second block selection signal BLKWL2 applied to the selected pass transistor block may be activated to be lower than or equal to the voltage of the first block selection signal BLKWL1.

In some example embodiments, such control of the first block selection signal BLKWL1 and the second block selection signal BLKWL2 may be implemented by controlling the activation time points of the first block selection signal BLKWL1 and the second block selection signal BLKWL2. In other words, as illustrated in FIG. 13A, the activation time point of the first block selection signal BLKWL1 may precede the activation time point of the second block selection signal BLKWL2.

While the voltage VSI of the driving signal SI is decreased in the program operation, the serial-gate transistor SGT in the selected pass transistor block may be turned off and the voltage VSI of the driving signal SI may be lower than the voltage VWL of the wordline WL. In this case, for example, at the time point Tf, the voltage of the second block selection signal BLKWL2 applied to the selected pass transistor block may be deactivated to be higher than the voltage VWL of the wordline WL and the voltage of the first block selection signal BLKWL1 applied to the selected pass transistor block may be deactivated to be lower than or equal to the voltage of the second block selection signal BLKWL2.

In some example embodiments, such control of the first block selection signal BLKWL1 and the second block selection signal BLKWL2 may be implemented by controlling the deactivation time points of the first block selection signal BLKWL1 and the second block selection signal BLKWL2. In other words, as illustrated in FIG. 13A, the deactivation time point of the first block selection signal BLKWL1 may precede the deactivation time point of the second block selection signal BLKWL2.

Figure 13D:
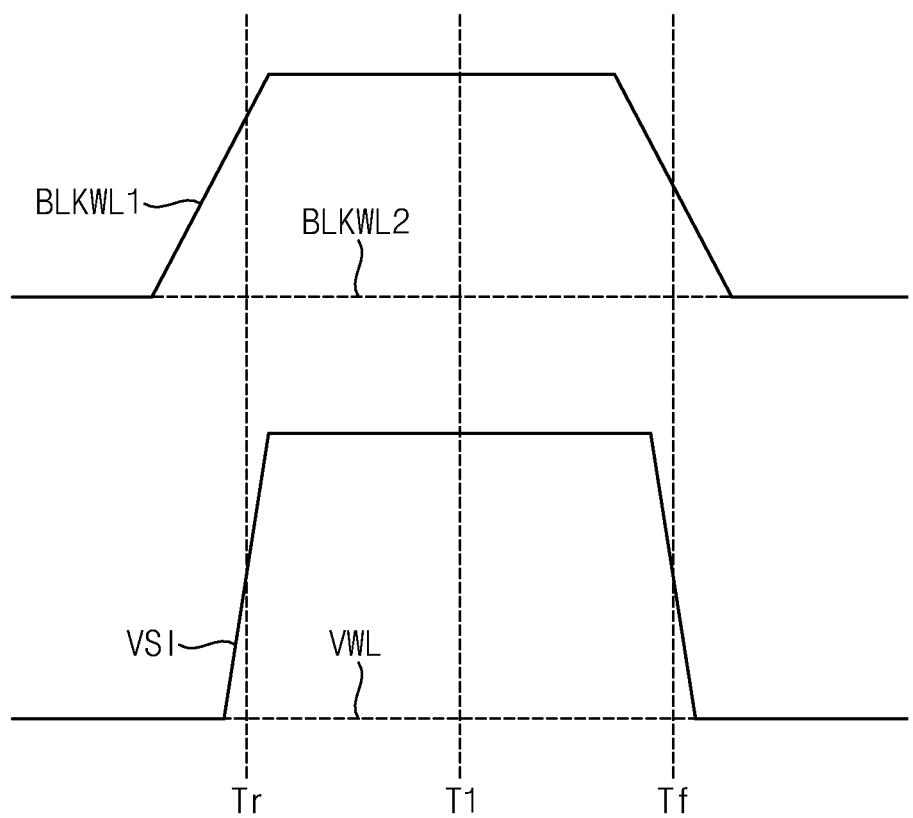

FIG. 13D illustrates example timings and waveforms of the voltage VSI of the driving signal SI applied to the first source-drain region 210, the voltage VWL of the wordline WL connected to the second source-drain region 220, the first block selection signal BLKW1 applied to the first gate G1 and the second block selection signal BLKW2 applied to the second gate G2, with respect to the unselected pass transistor block in the program operation.

Figure 13E:
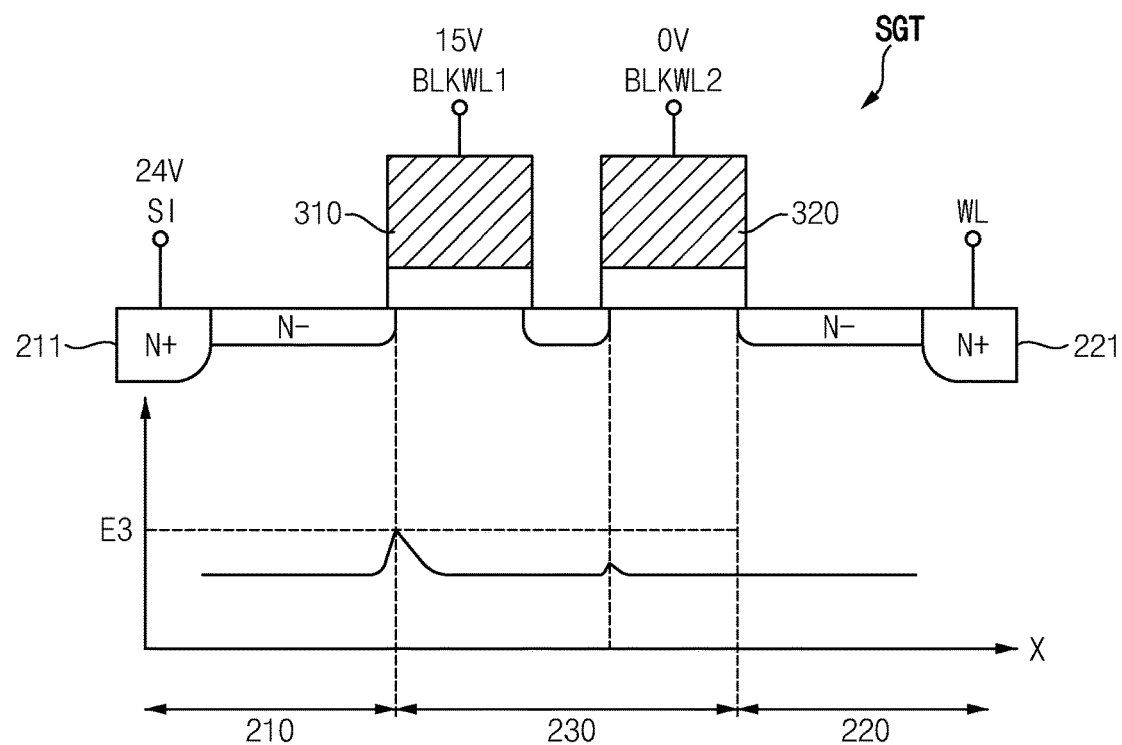

FIG. 13E illustrates example distributions of electric field along the horizontal direction X and example voltage levels of the driving signal SI, the wordline WL, the first block selection signal BLKWL1 and the second block selection signal BLKWL2, with respect to the unselected pass transistor block in the program operation. FIG. 13E illustrates a period, for example, corresponding to the time point T1 in FIG. 13D when the voltage VSI of the driving signal SI is fully increased in the program operation.

Referring to FIGS. 13D and 13E, in the program operation, the serial-gate transistor SGT in the unselected pass transistor block may maintain the turned-off state and the voltage VSI of the driving signal SI may be higher than the voltage VWL of the wordline WL. In this case, the voltage of the second block selection signal BLKWL2 applied to the unselected pass transistor block may be deactivated to be lower than the voltage VSI of the driving signal SI and the voltage of the first block selection signal BLKWL1 applied to the unselected pass transistor block may be deactivated to be higher than or equal to the voltage of the second block selection signal BLKWL2.

As described above with reference to FIGS. 4 and 5, the peak electric fields E1, E2 and E3 occurring in the program operation may be reduced using the serial-gate transistor SGT and the control of the block selection signals BLKWL1 and BLKWL2, according to example embodiments.

Figure 14A:
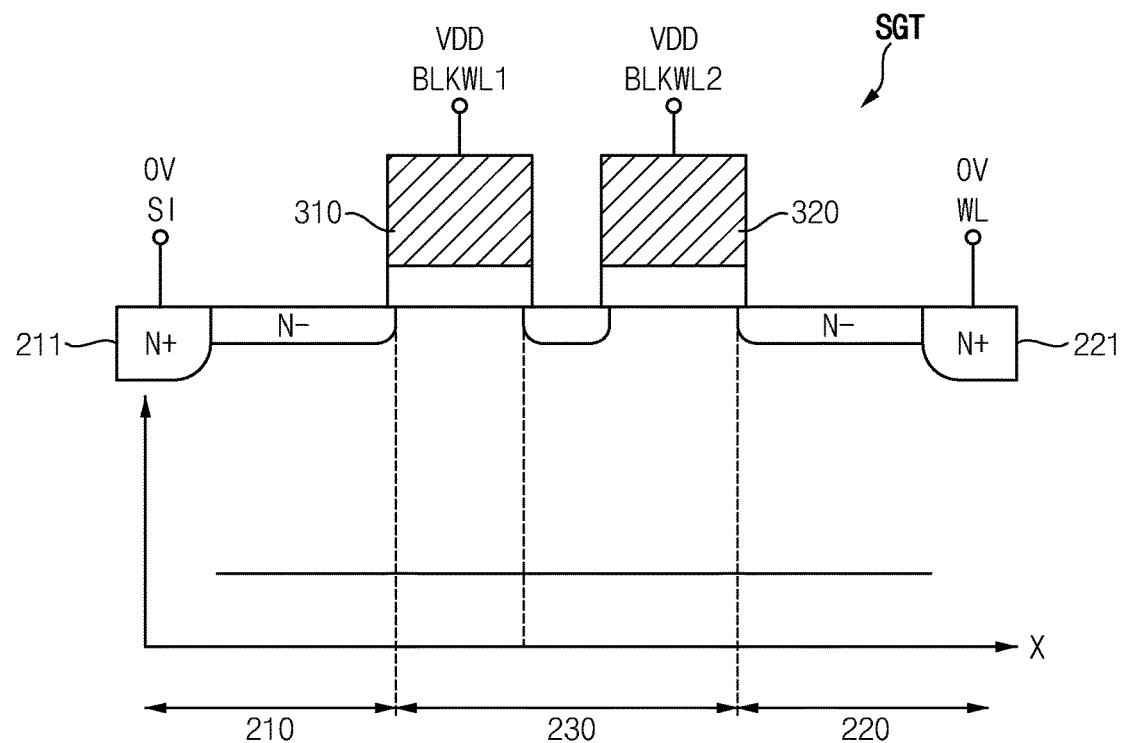
FIGS. 14A through 14C are diagrams illustrating operations of a serial-gate transistor included in a pass transistor block in an erase operation of a nonvolatile memory device, according to example embodiments.
Figure 14B:
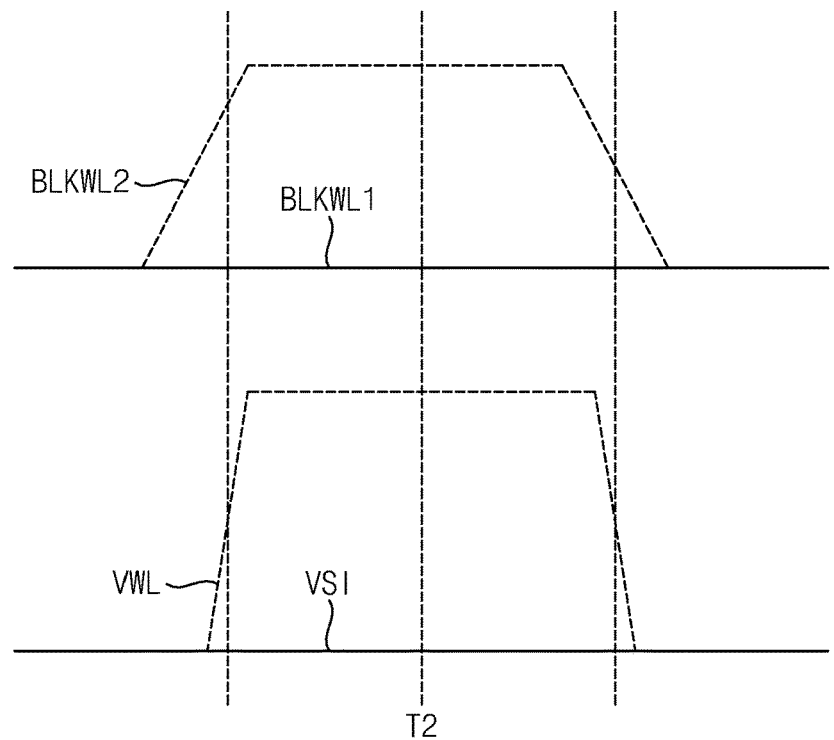
Figure 14C:
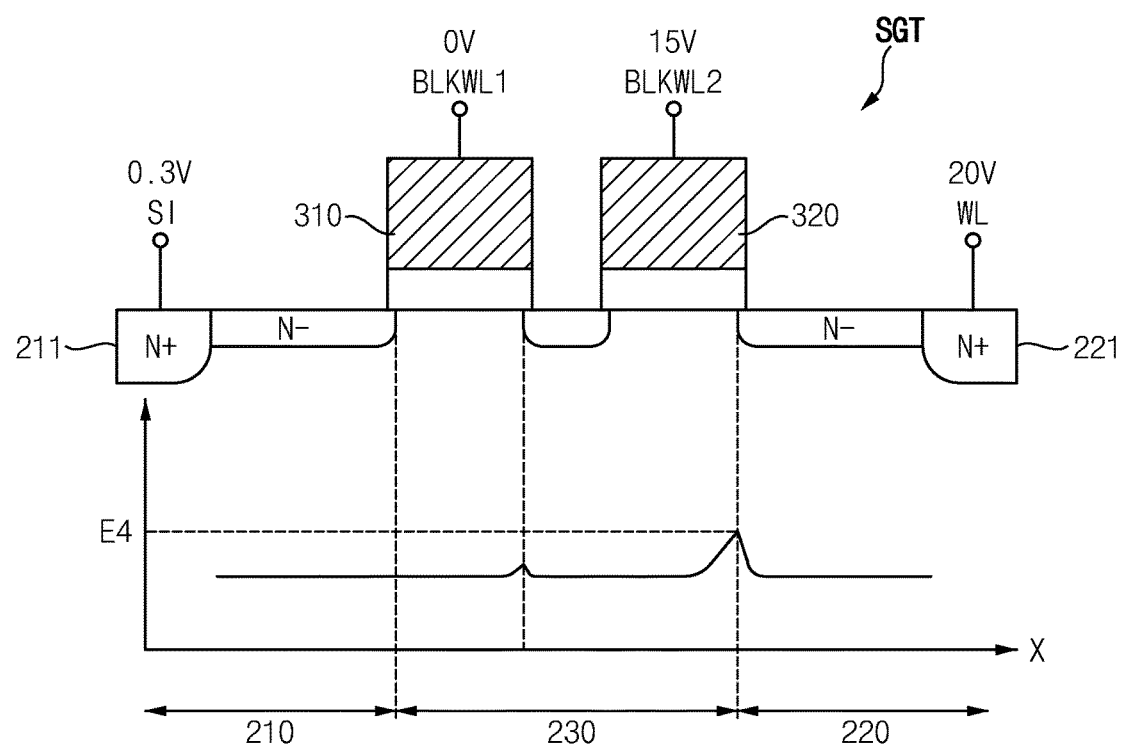

FIGS. 14A through 14C are diagrams illustrating operations of a serial-gate transistor included in a pass transistor block in an erase operation of a nonvolatile memory device, according to example embodiments.

In an erase operation, a plurality of serial-gate transistors included in a selected pass transistor block corresponding to a selected memory block may maintain a turned-on state and a plurality of serial-gate transistors included in an unselected pass transistor block corresponding to an unselected memory block may maintain a turned-off state.

FIG. 14A illustrates example distributions of electric field along the horizontal direction X and example voltage levels of the driving signal SI, the wordline WL, the first block selection signal BLKWL1 and the second block selection signal BLKWL2, with respect to the selected pass transistor block in the erase operation.

Referring to FIG. 14A, in the erase operation, the serial-gate transistor SGT in the selected pass transistor block may maintain the turned-on state. In this case, the voltage of the first block selection signal BLKWL1 and the voltage of the second block selection signal BLKWL2 applied to the selected pass transistor block may be activated to be higher than the voltage VWL of the wordline WL. For example, as illustrated in FIG. 14A, the voltage VSI of the driving signal SI and the voltage VWL of the wordline WL may maintain a ground voltage (e.g., 0V) and the voltage of the first block selection signal BLKWL1 and the voltage of the second block selection signal BLKWL2 may maintain a power supply voltage (e.g., VDD). In this case, the distribution of the electric field along the horizontal direction X may be uniform and the problems due to the peak electric field do not occur.

FIG. 14B illustrates example timings and waveforms of the voltage VSI of the driving signal SI applied to the first source-drain region 210, the voltage VWL of the wordline WL connected to the second source-drain region 220, the first block selection signal BLKW1 applied to the first gate G1 and the second block selection signal BLKW2 applied to the second gate G2, with respect to the unselected pass transistor block in the erase operation.

FIG. 14C illustrates example distributions of electric field along the horizontal direction X and example voltage levels of the driving signal SI, the wordline WL, the first block selection signal BLKWL1 and the second block selection signal BLKWL2, with respect to the unselected pass transistor block in the erase operation. FIG. 13C illustrates a period, for example, corresponding to the time point T2 in FIG. 14B when the voltage VWL of the wordline WL is fully increased in the erase operation.

Referring to FIGS. 14B and 14C, in the erase operation, the serial-gate transistor SGT in the unselected pass transistor block may maintain the turned-off state and the voltage VSI of the driving signal SI may be lower than the voltage VWL of the wordline WL. In this case, for example, at the time point T2, the voltage of the first block selection signal BLKWL1 applied to the unselected pass transistor block may be deactivated to be lower than the voltage VWL of the wordline WL and the voltage of the second block selection signal BLKWL2 applied to the unselected pass transistor block may be deactivated to be higher than or equal to the voltage of the first block selection signal BLKWL1.

As described with reference to FIGS. 4 and 5, the peak electric field E4 in the erase operation may be reduced using the serial-gate transistor SGT and the control of the block selection signals BLKWL1 and BLKWL2, according to example embodiments.

Figure 15:
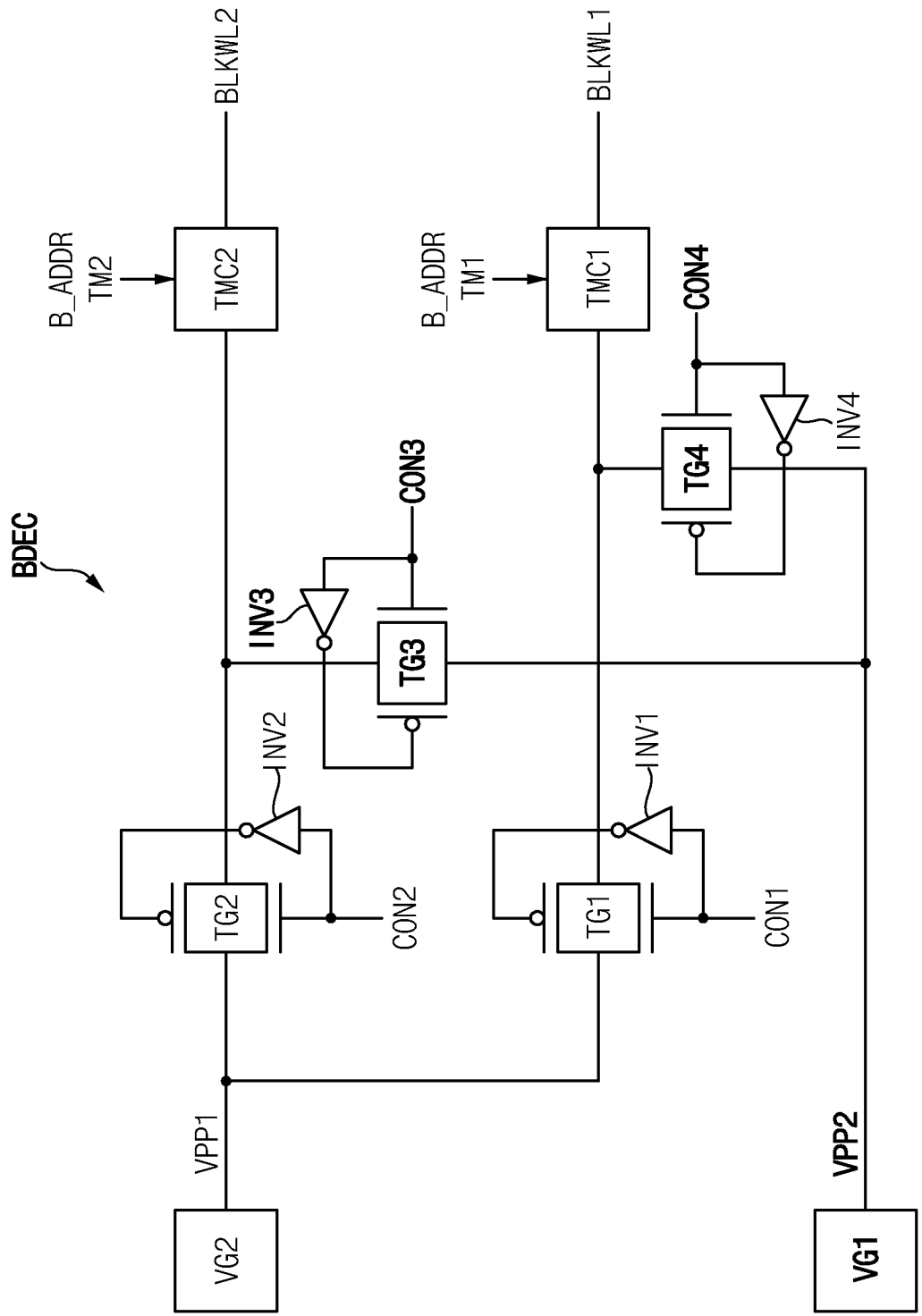
FIG. 15 is a diagram illustrating an example embodiment of a block decoder included in a nonvolatile memory device, according to example embodiments.

FIG. 15 is a diagram illustrating an example embodiment of a block decoder included in a nonvolatile memory device, according to example embodiments.

Referring to FIG. 15, a block decoder BDEC may include a plurality of transfer gates (e.g., first through fourth transfer gates TG1-TG4), a first timing control circuit TMC1, and a second timing control circuit TMC2.

Using the first through fourth transfer gates TG1-TG4, the block decoder BDEC may selectively transfer voltages VPP1 and VPP2 provided from voltage generators VG1 and VG2. Using the first timing control circuit TMC1 and the second timing control circuit TMC2, the block decoder BDEC may control the timings of the first block selection signal BLKWL1 and the second block selection signal BLKWL2.

The first through fourth transfer gates TG1-TG4 may be selectively turned on based on first through fourth transfer gate signals CON1-CON4 and inverted signals by inverters INV1-INV4. FIG. 15 illustrates a non-limiting example, and the configuration of the block decoder BDEC may be modified without deviating from the scope of the present disclosure.

The first timing control circuit TMC1 and the second timing control circuit TMC2 may control the activation time points and the deactivation time points of the first block selection signal BLKWL1 and the second block selection signal BLKWL2 based on a first timing control signal TM1 and a second timing control signal TM2. Alternatively or additionally, the first timing control circuit TMC1 and the second timing control circuit TMC2 may be selectively enabled based on a block address B_ADDR or a signal that is decoded from the block address B_ADDR.

For example, the control circuit 550 in FIG. 7 may generate and provide the transfer gate signals CON1-CON4 and the timing control signals TM1 and TM2 depending on the operation mode (e.g., the program operation, the read operation, or the erase operation) of the nonvolatile memory device.

The voltage generators VG1 and VG2 may be include in the voltage generator 560 in FIG. 7. The voltage generators VG1 and VG2 may be implemented with various components such as, but not limited to, voltage regulators, charge pumps, and the like. The voltage generators VG1 and VG2 may generate and provide the voltages VPP1 and VPP2 under control of the control circuit 550 depending on the operation mode (e.g., the program operation, the read operation, or the erase operation) of the nonvolatile memory device.

Figure 16:
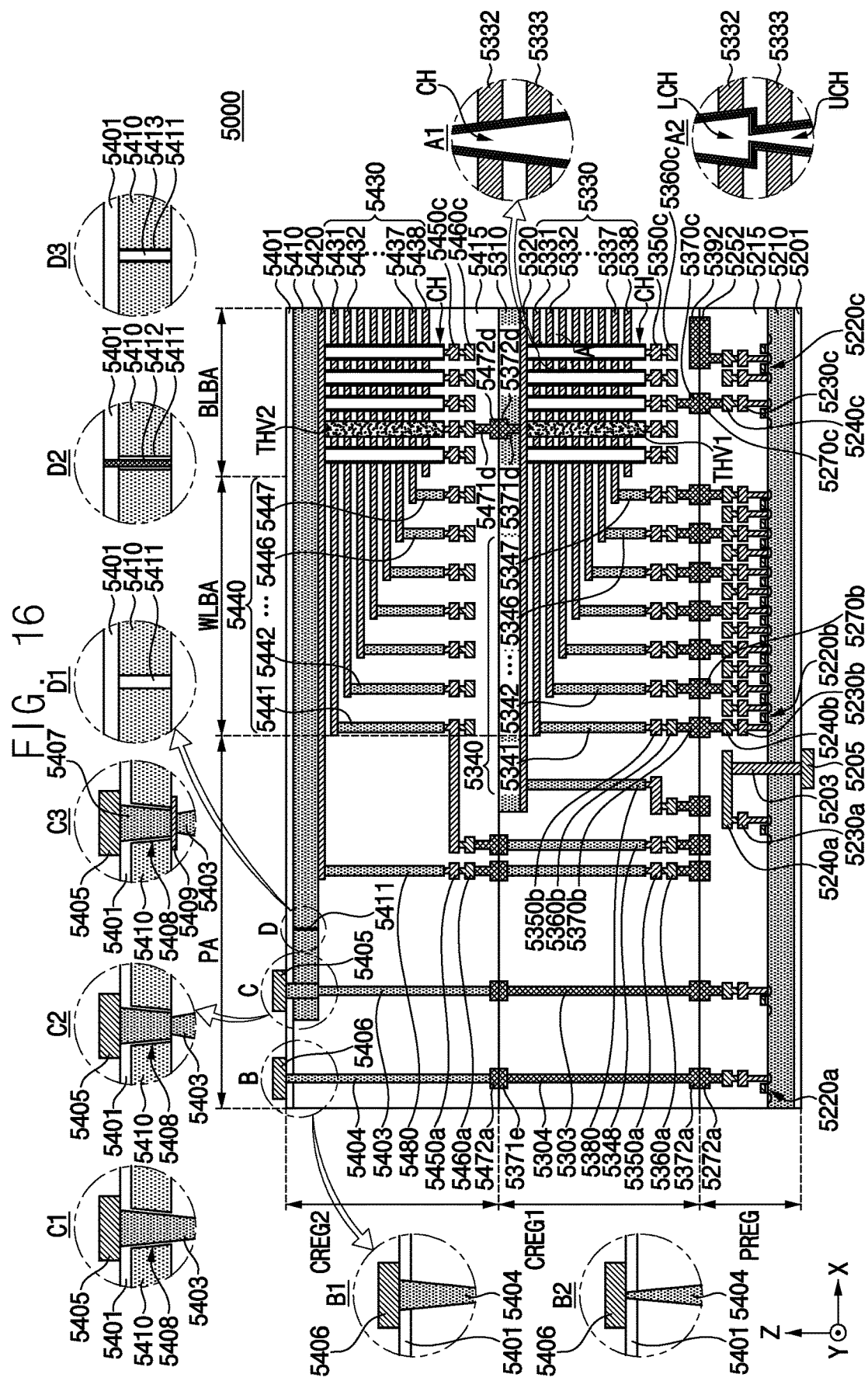
FIG. 16 is a cross-section diagram illustrating a memory device, according to example embodiments.

FIG. 16 is a cross-section diagram illustrating a memory device, according to example embodiments.

Referring to FIG. 16, the memory device 5000 may have a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may refer to a method of electrically and/or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively or additionally, the bonding metal patterns may be formed of other metals including, but not being limited to, aluminum (Al) or tungsten (W).

The memory device 5000 may include the at least one upper chip including the cell region. For example, as illustrated in FIG. 16, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2 and the lower chip including the peripheral circuit region PREG may be manufactured separately. Subsequently, the first upper chip, the second upper chip and the lower chip may be connected to each other by the bonding method to manufacture the memory device 5000, for example. In some embodiments, the first upper chip may be turned over and then may be connected to the lower chip by the bonding method, and the second upper chip may also be turned over and then may be connected to the first upper chip by the bonding method. Hereinafter, upper and lower portions of each of the first and second upper chips may be referred to based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 16. However, the present disclosure is not limited in this regard. For example, in some embodiments, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a word line bonding region WLBA, and a bit line bonding region BLBA.

The peripheral circuit region PREG may include a first substrate 5210 and a plurality of circuit elements 5220*a*, 5220*b* and 5220*c* formed on the first substrate 5210. An interlayer insulating layer 5215 including one or more insulating layers may be provided on the plurality of circuit elements 5220*a*, 5220*b* and 5220*c*, and a plurality of metal lines electrically connected to the plurality of circuit elements 5220*a*, 5220*b* and 5220*c* may be provided in the interlayer insulating layer 5215. For example, the plurality of metal lines may include first metal lines 5230*a*, 5230*b* and 5230*c* connected to the plurality of circuit elements 5220*a*, 5220*b* and 5220*c*, and second metal lines 5240*a*, 5240*b* and 5240*c* formed on the first metal lines 5230*a*, 5230*b* and 5230*c*. The plurality of metal lines may be formed of at least one of various conductive materials. In some embodiments, the first metal lines 5230*a*, 5230*b* and 5230*c* may be formed of tungsten having a relatively high electrical resistivity, and the second metal lines 5240*a*, 5240*b* and 5240*c* may be formed of copper having a relatively low electrical resistivity.

The first metal lines 5230*a*, 5230*b* and 5230*c* and the second metal lines 5240*a*, 5240*b* and 5240*c* are illustrated and described in the present embodiments. However, the present disclosure is not limited in this regard. For example, in some embodiments, at least one or more additional metal lines may further be formed on the second metal lines 5240*a*, 5240*b* and 5240*c*. In this case, the second metal lines 5240*a*, 5240*b* and 5240*c* may be formed of aluminum, and at least some of the additional metal lines formed on the second metal lines 5240*a*, 5240*b* and 5240*c* may be formed of copper having an electrical resistivity lower than that of aluminum of the second metal lines 5240*a*, 5240*b* and 5240*c*.

The interlayer insulating layer 5215 may be disposed on the first substrate 5210 and may include an insulating material such as silicon oxide and/or silicon nitride.

Each of the first and second cell regions CREG1 and CREG2 may include at least one memory block. The first cell region CREG1 may include a second substrate 5310 and a common source line 5320. A plurality of word lines 5330 (e.g., 5331 to 5338) may be stacked on the second substrate 5310 in a direction (e.g., the Z-axis direction) perpendicular to a top surface of the second substrate 5310. String selection lines and a ground selection line may be disposed on and under the word lines 5330, and the plurality of word lines 5330 may be disposed between the string selection lines and the ground selection line. Alternatively or additionally, the second cell region CREG2 may include a third substrate 5410 and a common source line 5420, and a plurality of word lines 5430 (e.g., 5431 to 5438) may be stacked on the third substrate 5410 in a direction (e.g., the Z-axis direction) perpendicular to a top surface of the third substrate 5410. Each of the second substrate 5310 and the third substrate 5410 may be formed of at least one of various materials, such as, but not limited to, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some embodiments, as illustrated in a region 'A1', the channel structure CH may be provided in the bit line bonding region BLBA and may extend in the direction perpendicular to the top surface of the second substrate 5310 to penetrate the word lines 5330, the string selection lines, and the ground selection line. The channel structure CH may include a data storage layer, a channel layer, and a filling insulation layer. The channel layer may be electrically connected to a first metal line 5350*c* and a second metal line 5360*c* in the bit line bonding region BLBA. For example, the second metal line 5360*c* may be a bit line and may be connected to the channel structure CH through the first metal line 5350*c*. The bit line 5360*c* may extend in a first direction (e.g., a Y-axis direction) parallel to the top surface of the second substrate 5310.

In some embodiments, as illustrated in a region 'A2', the channel structure CH may include a lower channel LCH and an upper channel UCH, which may be connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower word lines 5331 and 5332. The lower channel LCH may include a data storage layer, a channel layer, and a filling insulation layer and may be connected to the upper channel UCH. The upper channel UCH may penetrate upper word lines 5333 to 5338. The upper channel UCH may include a data storage layer, a channel layer, and a filling insulation layer, and the channel layer of the upper channel UCH may be electrically connected to the first metal line 5350*c* and the second metal line 5360*c*. As a length of a channel increases, due to characteristics of manufacturing processes, it may be difficult to form a channel having a substantially uniform width. The memory device 5000, according to the present disclosure, may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 5332 and 5333 adjacent to the boundary between the lower channel LCH and the upper channel UCH may be the dummy word lines. In this case, data may not be stored in memory cells connected to the dummy word line. Alternatively or additionally, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus, it may be possible to reduce an influence of a non-uniform channel width between the lower and upper channels LCH and UCH on an operation of the memory device.

In some embodiments, the number of the lower word lines 5331 and 5332 penetrated by the lower channel LCH may be less than the number of the upper word lines 5333 to 5338 penetrated by the upper channel UCH in the region 'A2'. However, the present disclosure is not limited in this regard. For example, in some embodiments, the number of the lower word lines penetrated by the lower channel LCH may be equal to or more than the number of the upper word lines penetrated by the upper channel UCH. Alternatively or additionally, structural features and connection relation of the channel structure CH disposed in the second cell region CREG2 may be substantially the same as those of the channel structure CH disposed in the first cell region CREG1.

In the bit line bonding region BLBA, a first through-electrode THV1 may be provided in the first cell region CREG1, and a second through-electrode THV2 may be provided in the second cell region CREG2. As illustrated in FIG. 16, the first through-electrode THV1 may penetrate the common source line 5320 and the plurality of word lines 5330. In some embodiments, the first through-electrode THV1 may further penetrate the second substrate 5310. The first through-electrode THV1 may include a conductive material. Alternatively or additionally, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 5372*d* and a second through-metal pattern 5472*d*. The first through-metal pattern 5372*d* may be formed at a bottom end of the first upper chip including the first cell region CREG1, and the second through-metal pattern 5472*d* may be formed at a top end of the second upper chip including the second cell region CREG2. The first through-electrode THV1 may be electrically connected to the first metal line 5350*c* and the second metal line 5360*c*. A lower via 5371*d* may be formed between the first through-electrode THV1 and the first through-metal pattern 5372*d*, and an upper via 5471*d* may be formed between the second through-electrode THV2 and the second through-metal pattern 5472*d*. The first through-metal pattern 5372*d* and the second through-metal pattern 5472*d* may be connected to each other by the bonding method.

In some embodiments, in the bit line bonding region BLBA, an upper metal pattern 5252 may be formed in an uppermost metal layer of the peripheral circuit region PERI, and an upper metal pattern 5392 having the same shape as the upper metal pattern 5252 may be formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bit line bonding region BLBA, the bit line 5360*c* may be electrically connected to a page buffer included in the peripheral circuit region PERI. For example, some of the circuit elements 5220*c* of the peripheral circuit region PREG may constitute the page buffer, and the bit line 5360*c* may be electrically connected to the circuit elements 5220*c* constituting the page buffer through an upper bonding metal pattern 5370*c* of the first cell region CREG1 and an upper bonding metal pattern 5270*c* of the peripheral circuit region PERI.

Continuing to refer to FIG. 16, in the word line bonding region WLBA, the word lines 5330 of the first cell region CREG1 may extend in a second direction (e.g., an X-axis direction) parallel to the top surface of the second substrate 5310 and may be connected to a plurality of cell contact plugs 5340 (e.g., 5341 to 5347). First metal lines 5350*b* and second metal lines 5360*b* may be sequentially connected onto the cell contact plugs 5340 connected to the word lines 5330. In the word line bonding region WLBA, the cell contact plugs 5340 may be connected to the peripheral circuit region PREG through upper bonding metal patterns 5370*b* of the first cell region CREG1 and upper bonding metal patterns 5270*b* of the peripheral circuit region PERI.

The cell contact plugs 5340 may be electrically connected to a row decoder included in the peripheral circuit region PERI. For example, some of the circuit elements 5220*b* of the peripheral circuit region PREG may constitute the row decoder, and the cell contact plugs 5340 may be electrically connected to the circuit elements 5220*b* constituting the row decoder through the upper bonding metal patterns 5370*b* of the first cell region CREG1 and the upper bonding metal patterns 5270*b* of the peripheral circuit region PERI. In some embodiments, an operating voltage of the circuit elements 5220*b* constituting the row decoder may be different from an operating voltage of the circuit elements 5220*c* constituting the page buffer. For example, the operating voltage of the circuit elements 5220*c* constituting the page buffer may be greater than the operating voltage of the circuit elements 5220*b* constituting the row decoder.

In some embodiments, in the word line bonding region WLBA, the word lines 5430 of the second cell region CREG2 may extend in the second direction (e.g., the X-axis direction) parallel to the top surface of the third substrate 5410 and may be connected to a plurality of cell contact plugs 5440 (e.g., 5441 to 5447). The cell contact plugs 5440 may be connected to the peripheral circuit region PREG through an upper metal pattern of the second cell region CREG2 and lower and upper metal patterns and a cell contact plug 5348 of the first cell region CREG1.

In the word line bonding region WLBA, the upper bonding metal patterns 5370*b* may be formed in the first cell region CREG1, and the upper bonding metal patterns 5270*b* may be formed in the peripheral circuit region PERI. The upper bonding metal patterns 5370*b* of the first cell region CREG1 and the upper bonding metal patterns 5270*b* of the peripheral circuit region PREG may be electrically connected to each other by the bonding method. The upper bonding metal patterns 5370*b* and the upper bonding metal patterns 5270*b* may be formed of at least one metal including, but not limited to, aluminum, copper, and tungsten.

In the external pad bonding region PA, a lower metal pattern 5371*e* may be formed in a lower portion of the first cell region CREG1, and an upper metal pattern 5472*a* may be formed in an upper portion of the second cell region CREG2. The lower metal pattern 5371*e* of the first cell region CREG1 and the upper metal pattern 5472*a* of the second cell region CREG2 may be connected to each other by the bonding method in the external pad bonding region PA. In some embodiments, an upper metal pattern 5372*a* may be formed in an upper portion of the first cell region CREG1, and an upper metal pattern 5272*a* may be formed in an upper portion of the peripheral circuit region PERI. The upper metal pattern 5372*a* of the first cell region CREG1 and the upper metal pattern 5272*a* of the peripheral circuit region PREG may be connected to each other by the bonding method.

Common source line contact plugs 5380 and 5480 may be disposed in the external pad bonding region PA. The common source line contact plugs 5380 and 5480 may be formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350*a* and a second metal line 5360*a* may be sequentially stacked on the common source line contact plug 5380 of the first cell region CREG1, and a first metal line 5450*a* and a second metal line 5460*a* may be sequentially stacked on the common source line contact plug 5480 of the second cell region CREG2.

Input/output pads 5205, 5405 and 5406 may be disposed in the external pad bonding region PA. As shown in FIG. 16, a lower insulating layer 5201 may cover a bottom surface of the first substrate 5210, and a first input/output pad 5205 may be formed on the lower insulating layer 5201. The first input/output pad 5205 may be connected to at least one of a plurality of the circuit elements 5220*a* disposed in the peripheral circuit region PREG through a first input/output contact plug 5203 and may be separated from the first substrate 5210 by the lower insulating layer 5201. Alternatively or additionally, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 may be formed on the third substrate 5410. A second input/output pad 5405 and/or a third input/output pad 5406 may be disposed on the upper insulating layer 5401. The second input/output pad 5405 may be connected to at least one of the plurality of circuit elements 5220*a* disposed in the peripheral circuit region PREG through second input/output contact plugs 5403 and 5303, and the third input/output pad 5406 may be connected to at least one of the plurality of circuit elements 5220*a* disposed in the peripheral circuit region PREG through third input/output contact plugs 5404 and 5304.

In some embodiments, the third substrate 5410 may not be disposed in a region in which the input/output contact plug is disposed. For example, as illustrated in a region 'B', the third input/output contact plug 5404 may be separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 may be formed by at least one of various processes.

In some embodiments, as illustrated in a region 'B1', the third input/output contact plug 5404 may extend in a third direction (e.g., the Z-axis direction), and a diameter of the third input/output contact plug 5404 may become progressively greater (e.g., wider) toward the upper insulating layer 5401. In other words, a diameter of the channel structure CH described in the region 'A1' may become progressively less (e.g., narrower) toward the upper insulating layer 5401, but the diameter of the third input/output contact plug 5404 may become progressively greater toward the upper insulating layer 5401. For example, the third input/output contact plug 5404 may be formed after the second cell region CREG2 and the first cell region CREG1 are bonded to each other by the bonding method.

In some embodiments, as illustrated in a region 'B2', the third input/output contact plug 5404 may extend in the third direction (e.g., the Z-axis direction), and a diameter of the third input/output contact plug 5404 may become progressively less (e.g., narrower) toward the upper insulating layer

5401. In other words, like the channel structure CH, the diameter of the third input/output contact plug 5404 may become progressively less (e.g., narrower) toward the upper insulating layer 5401. For example, the third input/output contact plug 5404 may be formed together with the cell contact plugs 5440 before the second cell region CREG2 and the first cell region CREG1 are bonded to each other.

In some embodiments, the input/output contact plug may overlap with the third substrate 5410. For example, as illustrated in a region 'C', the second input/output contact plug 5403 may penetrate the interlayer insulating layer 5415 of the second cell region CREG2 in the third direction (e.g., the Z-axis direction) and may be electrically connected to the second input/output pad 5405 through the third substrate 5410. In this case, a connection structure of the second input/output contact plug 5403 and the second input/output pad 5405 may be realized by various methods.

In some embodiments, as illustrated in a region 'C1', an opening 5408 may be formed to penetrate the third substrate 5410, and the second input/output contact plug 5403 may be connected directly to the second input/output pad 5405 through the opening 5408 formed in the third substrate 5410. In this case, as illustrated in the region 'C1', a diameter of the second input/output contact plug 5403 may become progressively greater (e.g., wider) toward the second input/output pad 5405. However, the present disclosure is not limited in this regard. For example, in some embodiments, the diameter of the second input/output contact plug 5403 may become progressively less (e.g., narrower) toward the second input/output pad 5405.

In some embodiments, as illustrated in a region 'C2', the opening 5408 penetrating the third substrate 5410 may be formed, and a contact 5407 may be formed in the opening 5408. An end of the contact 5407 may be connected to the second input/output pad 5405, and another end of the contact 5407 may be connected to the second input/output contact plug 5403. Thus, the second input/output contact plug 5403 may be electrically connected to the second input/output pad 5405 through the contact 5407 in the opening 5408. In this case, as illustrated in the region 'C2', a diameter of the contact 5407 may become progressively greater (e.g., wider) toward the second input/output pad 5405, and a diameter of the second input/output contact plug 5403 may become progressively less (e.g., narrower) toward the second input/output pad 5405. For example, the second input/output contact plug 5403 may be formed together with the cell contact plugs 5440 before the second cell region CREG2 and the first cell region CREG1 are bonded to each other, and the contact 5407 may be formed after the second cell region CREG2 and the first cell region CREG1 are bonded to each other.

In some embodiments illustrated in a region 'C3', a stopper 5409 may further be formed on a bottom end of the opening 5408 of the third substrate 5410, as compared with the embodiments of the region 'C2'. The stopper 5409 may be a metal line formed in the same layer as the common source line 5420. Alternatively or additionally, the stopper 5409 may be a metal line formed in the same layer as at least one of the word lines 5430. The second input/output contact plug 5403 may be electrically connected to the second input/output pad 5405 through the contact 5407 and the stopper 5409.

Similar to the second and third input/output contact plugs 5403 and 5404 of the second cell region CREG2, a diameter of each of the second and third input/output contact plugs 5303 and 5304 of the first cell region CREG1 may become progressively less (e.g., narrower) toward the lower metal pattern 5371*e* and/or may become progressively greater (e.g., wider) toward the lower metal pattern 5371*e*.

In some embodiments, a slit 5411 may be formed in the third substrate 5410. For example, the slit 5411 may be formed at a certain position of the external pad bonding region PA. For example, as illustrated in a region 'D', the slit 5411 may be located between the second input/output pad 5405 and the cell contact plugs 5440 when viewed in a plan view.

Alternatively or additionally, the second input/output pad 5405 may be located between the slit 5411 and the cell contact plugs 5440 when viewed in a plan view.

In some embodiments, as illustrated in a region 'D1', the slit 5411 may be formed to penetrate the third substrate 5410. For example, the slit 5411 may be used to prevent the third substrate 5410 from being finely cracked when the opening 5408 is formed. However, the present disclosure is not limited in this regard. For example, in some embodiments, the slit 5411 may be formed to have a depth ranging from about 60% to about 70% of a thickness of the third substrate 5410.

In some embodiments, as illustrated in a region 'D2', a conductive material 5412 may be formed in the slit 5411. For example, the conductive material 5412 may be used to discharge a leakage current occurring in driving of the circuit elements in the external pad bonding region PA to the outside. In this case, the conductive material 5412 may be connected to an external ground line.

In some embodiments, as illustrated in a region 'D3', an insulating material 5413 may be formed in the slit 5411. For example, the insulating material 5413 may be used to electrically isolate the second input/output pad 5405 and the second input/output contact plug 5403 disposed in the external pad bonding region PA from the word line bonding region WLBA. Since the insulating material 5413 is formed in the slit 5411, it may be possible to prevent a voltage provided through the second input/output pad 5405 from affecting a metal layer disposed on the third substrate 5410 in the word line bonding region WLBA.

In some embodiments, the first to third input/output pads 5205, 5405 and 5406 may be selectively formed. For example, the memory device 5000 may be realized to include only the first input/output pad 5205 disposed on the first substrate 5210, to include only the second input/output pad 5405 disposed on the third substrate 5410, and/or to include only the third input/output pad 5406 disposed on the upper insulating layer 5401.

In some embodiments, at least one of the second substrate 5310 of the first cell region CREG1 and the third substrate 5410 of the second cell region CREG2 may be used as a sacrificial substrate and may be completely and/or partially removed before and/or after a bonding process. An additional layer may be stacked after the removal of the substrate. For example, the second substrate 5310 of the first cell region CREG1 may be removed before and/or after the bonding process of the peripheral circuit region PREG and the first cell region CREG1. Subsequently, an insulating layer covering a top surface of the common source line 5320 or a conductive layer for connection may be formed. Similarly, the third substrate 5410 of the second cell region CREG2 may be removed before and/or after the bonding process of the first cell region CREG1 and the second cell region CREG2, and subsequently, the upper insulating layer 5401 covering a top surface of the common source line 5420 or a conductive layer for connection may be formed.

Figure 17:
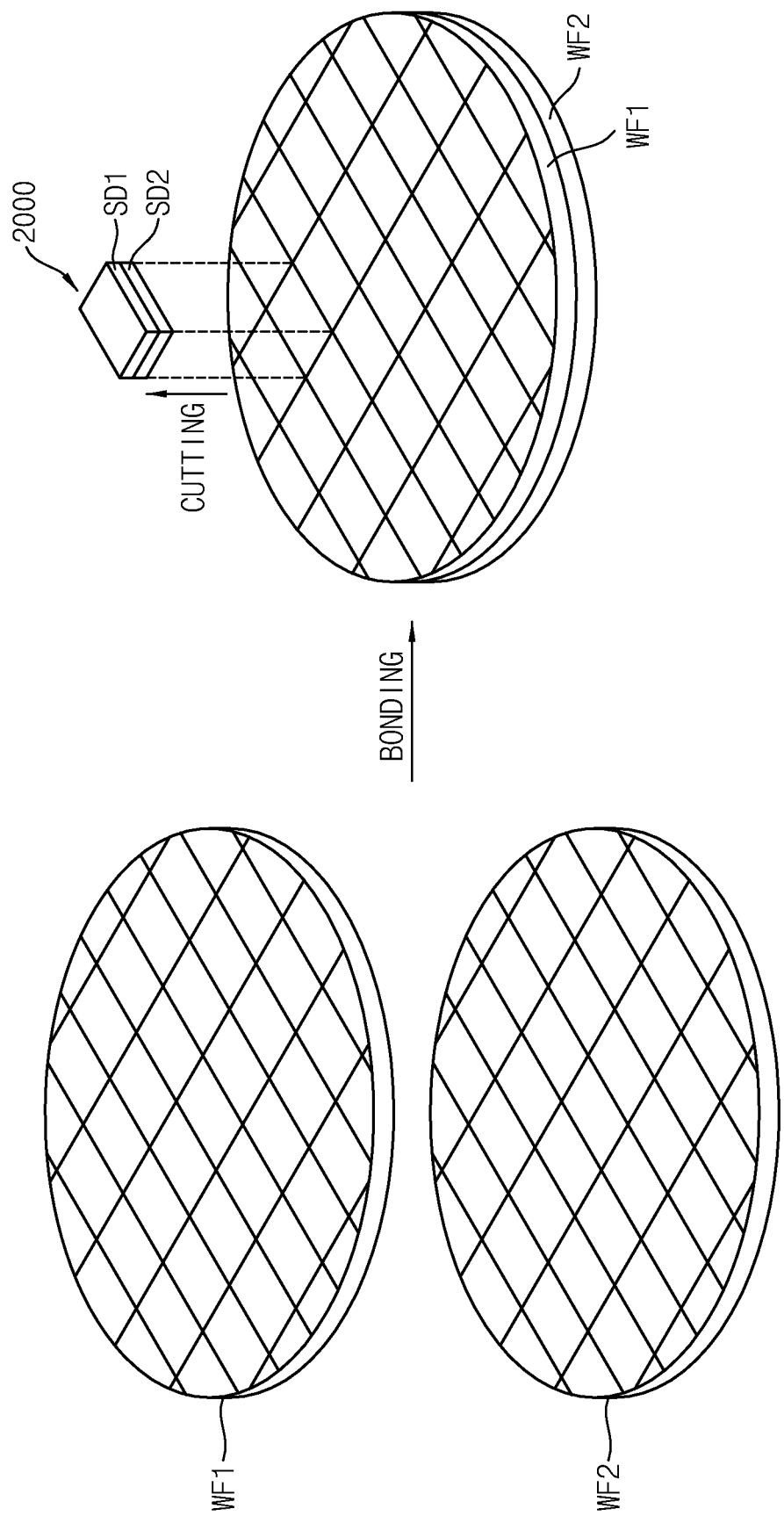
FIG. 17 is a conceptual diagram illustrating manufacturing processes of a stacked semiconductor device, according to example embodiments.

FIG. 17 is a conceptual diagram illustrating manufacturing processes of a stacked semiconductor device, according to example embodiments.

Referring to FIG. 17, respective integrated circuits may be formed on a first wafer WF1 and a second wafer WF2. The memory cell array may be formed in the first wafer WF1 and the peripheral circuits may be formed in the second wafer WF2.

After the various integrated circuits have been respectively formed on the first and second wafers WF1 and WF2, the first wafer WF1 and the second wafer WF2 may be bonded together. The bonded wafers WF1 and WF2 may then be cut (or divided) into separate chips, in which each chip corresponds to a semiconductor device such as, for example, the nonvolatile memory device 2000, including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1 and each cut portion of the second wafer WF2 corresponds to the second semiconductor die SD2.

Figure 18:
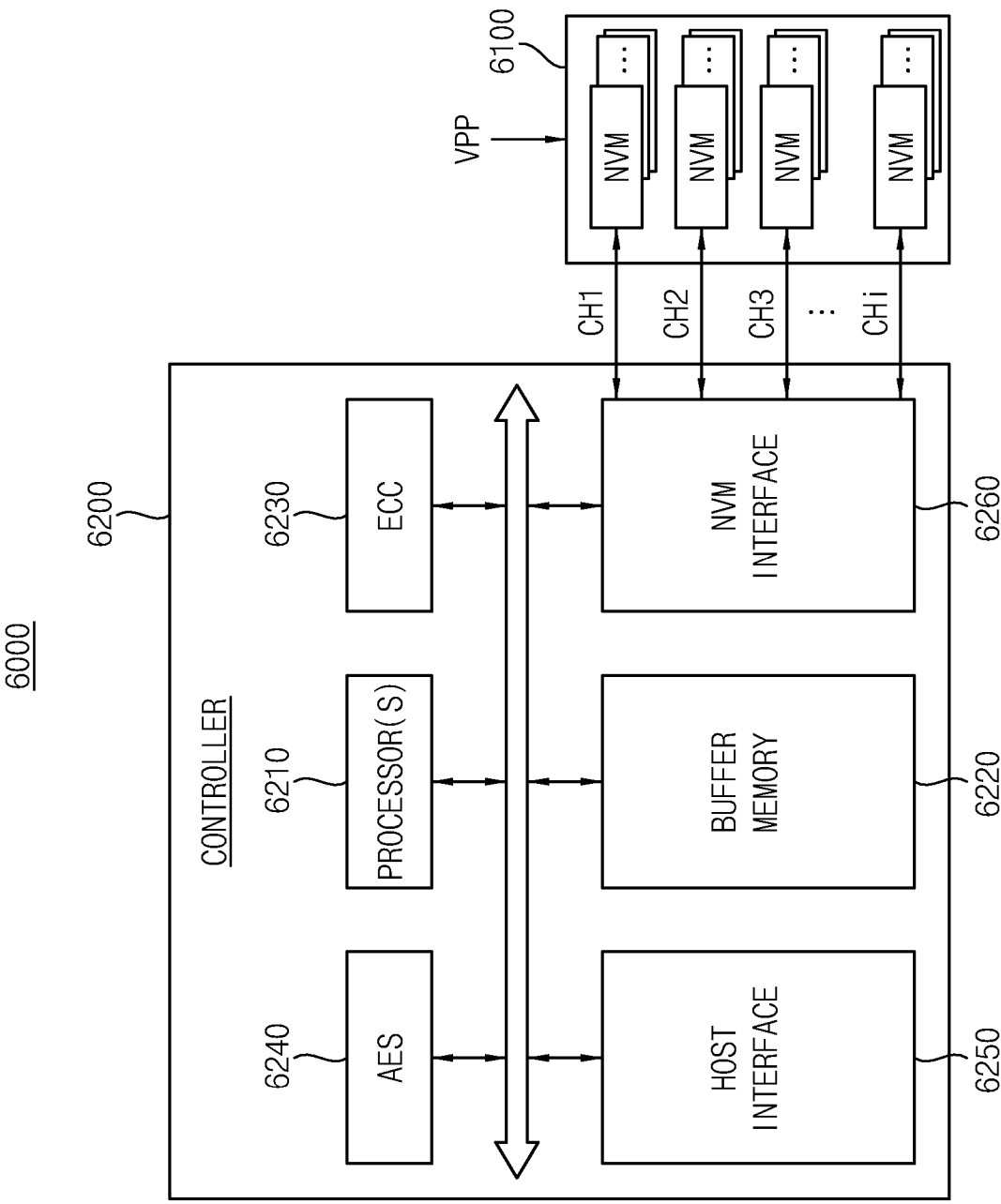
FIG. 18 is a block diagram illustrating a storage device, according to example embodiments.

FIG. 18 is a block diagram illustrating a storage device, according to example embodiments. In some example embodiments, a storage device of FIG. 18 may be a solid state drive (SSD).

Referring to FIG. 18, an SSD 6000 may generally include nonvolatile memory devices 6100 and an SSD controller 5200.

The nonvolatile memory devices 6100 may be configured to receive a high voltage VPP. One or more of the nonvolatile memory devices 6100 may be provided as memory devices, according to the present disclosure as described above. Accordingly, the nonvolatile memory devices 6100 may transfer high voltages to wordlines using serial-gate transistors as described above.

The SSD controller 6200 may be connected to the nonvolatile memory devices 6100 via multiple channels CH1, CH2, CHI3, . . . , CHi, where i is an integer greater than 0. The SSD controller 6200 may include one or more processors 6210, a buffer memory 6220, an error correction code (ECC) circuit 6230, an advanced encryption standard (AES) engine 6240, a host interface 6250, and a nonvolatile memory interface 6260. The buffer memory 6220 may store data used to drive the SSD controller 6200. The buffer memory 6220 may include multiple memory lines. Each memory line may store data and/or commands. The ECC circuit 6230 may calculate error correction code values of data to be programmed at a writing operation, and may correct an error of read data using an error correction code value at a read operation. In a data recovery operation, the ECC circuit 6230 may correct an error of data recovered from the nonvolatile memory devices 6100.

The AES engine 6240 may perform at least one of encryption and decryption of data input to and/or output from the SSD controller 6200 using a symmetric key algorithm. The AES engine 6240 may include an encryption module and/or a decryption module (not shown).

The encryption module and the decryption module may be implemented as two modules distinct from each other and/or may be combined into a single module.

As described above, the serial-gate transistor and the nonvolatile memory device may reduce the peak electric field caused in the channel through the configuration of the serial-gate transistor and the independent control of the gate signals. The horizontal length of the channel may be reduced and the area of the serial-gate transistor and the nonvolatile memory device may be reduced, by decreasing the junction breakdown voltage, the tunneling current, the gate induced drain leakage (GIDL) current and the hot carrier injection through the reduction of the peak electric field.

The present disclosure may be applied to electronic devices and/or systems including a nonvolatile memory device. For example, the present disclosure may be applied to systems such as, but not limited to, a memory card, a solid state drive (SSD), an embedded multimedia card (eMMC), a universal flash storage (UFS), a mobile phone, a smartphone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an Internet of Things (IoT) device, an Internet of Everything (IoE) device, an e-book, a virtual reality (VR) device, an augmented reality (AR) device, a server system, an automotive driving system, and the like.

The foregoing is illustrative of example embodiments and is not to be construed as limiting thereof. Although a few example embodiments have been described, those skilled in the art will readily appreciate that many modifications are possible in the example embodiments without materially departing from the present disclosure.

What is claimed is:

1. A nonvolatile memory device, comprising:
    a plurality of memory blocks;
    a plurality of pass transistor blocks, each pass transistor block of the plurality of pass transistor blocks comprising a plurality of serial-gate transistors configured to transfer a plurality of driving signals to a corresponding memory block of the plurality of memory blocks, each serial-gate transistor of the plurality of serial-gate transistors comprising:
        a first source-drain region, a gate region, and a second source-drain region that are sequentially arranged in a horizontal direction at a semiconductor substrate; and
        a plurality of gates that are sequentially arranged in the horizontal direction in the gate region above the semiconductor substrate,
    wherein the plurality of gates are electrically decoupled from each other,
    wherein each gate of the plurality of gates is directly coupled to a corresponding block selection signal of a plurality of block selection signals, and
    wherein the plurality of gates are controlled independently of each other.

2. The nonvolatile memory device of claim 1, wherein:
    the plurality of gates comprise a first gate and a second gate,
    the first gate is adjacent to the first source-drain region in the horizontal direction,
    the second gate is adjacent to the second source-drain region in the horizontal direction, and
    a first block selection signal applied to the first gate and a second block selection signal applied to the second gate are controlled independently of each other based on a voltage of a driving signal applied to the first source-drain region and a voltage of a wordline coupled to the second source-drain region.

3. The nonvolatile memory device of claim 2, wherein:
    based on the voltage of the driving signal being higher than the voltage of the wordline, a voltage of the first block selection signal is higher than a voltage of the second block selection signal, and based on the voltage of the driving signal being lower than the voltage of the wordline, the voltage of the first block selection signal is lower than the voltage of the second block selection signal.

4. The nonvolatile memory device of claim 2, wherein, based on the voltage of the driving signal and the voltage of the wordline:
   perform a field relaxation function by at least one of the first gate and the second gate, and
   perform a switching function by at least another one of the first gate and the second gate.

5. The nonvolatile memory device of claim 2, wherein, based on the voltage of the driving signal being higher than the voltage of the wordline and each serial-gate transistor of the plurality of serial-gate transistors being in a turned-on state:
   a voltage of the first block selection signal is activated to be higher than the voltage of the driving signal, and
   a voltage of the second block selection signal is activated to be lower than or equal to the voltage of the first block selection signal.

6. The nonvolatile memory device of claim 2, wherein, based on the voltage of the driving signal being higher than the voltage of the wordline and each serial-gate transistor of the plurality of serial-gate transistors being in a turned-on state, the second block selection signal is activated after the first block selection signal has been activated.

7. The nonvolatile memory device of claim 2, wherein, based on the voltage of the driving signal being lower than the voltage of the wordline and each serial-gate transistor of the plurality of serial-gate transistors being in a turned-off state:
   a voltage of the first block selection signal is deactivated to be lower than the voltage of the wordline, and
   a voltage of the second block selection signal is deactivated to be lower than or equal to the voltage of the first block selection signal.

8. The nonvolatile memory device of claim 2, wherein, based on the voltage of the driving signal being lower than the voltage of the wordline and each serial-gate transistor of the plurality of serial-gate transistors being in a turned-off state, the second block selection signal is deactivated after the first block selection signal has been deactivated.

9. The nonvolatile memory device of claim 2, wherein, in a program operation:
   a selected plurality of serial-gate transistors of a selected pass transistor block corresponding to a selected memory block is set to a turned-on state, and
   an unselected plurality of serial-gate transistors of an unselected pass transistor block corresponding to an unselected memory block is maintained in a turned-off state.

10. The nonvolatile memory device of claim 9, wherein, based on the voltage of the driving signal being increased in the program operation:
    a voltage of the first block selection signal applied to the selected pass transistor block is activated to be higher than the voltage of the driving signal, and
    a voltage of the second block selection signal applied to the selected pass transistor block is activated to be lower than or equal to the voltage of the first block selection signal.

11. The nonvolatile memory device of claim 9, wherein, based on the voltage of the driving signal being decreased in the program operation:
    a voltage of the second block selection signal applied to the selected pass transistor block is deactivated to be higher than the voltage of the wordline, and
    a voltage of the first block selection signal applied to the selected pass transistor block is deactivated to be lower than or equal to the voltage of the second block selection signal.

12. The nonvolatile memory device of claim 9, wherein, in the program operation:
    a voltage of the second block selection signal applied to the unselected pass transistor block is deactivated to be lower than the voltage of the driving signal, and
    a voltage of the first block selection signal applied to the unselected pass transistor block is deactivated to be higher than or equal to the voltage of the second block selection signal.

13. The nonvolatile memory device of claim 2, wherein, in an erase operation:
    a selected plurality of serial-gate transistors of a selected pass transistor block corresponding to a selected memory block is maintained in a turned-on state, and
    an unselected plurality of serial-gate transistors of an unselected pass transistor block corresponding to an unselected memory block is maintained in a turned-off state.

14. The nonvolatile memory device of claim 13, wherein, in the erase operation, a voltage of the first block selection signal and a voltage of the second block selection signal applied to the selected pass transistor block are activated to be higher than the voltage of the wordline.

15. The nonvolatile memory device of claim 13, wherein, in the erase operation:
    a voltage of the first block selection signal applied to the unselected pass transistor block is deactivated to be lower than the voltage of the wordline, and
    a voltage of the second block selection signal applied to the unselected pass transistor block is deactivated to be higher than or equal to the voltage of the first block selection signal.

16. The nonvolatile memory device of claim 2, wherein:
    the first source-drain region comprises a first region and a second region,
    the driving signal is applied to the first region of the first source-drain region,
    the first region is formed by doping the semiconductor substrate with a first dopant density,
    the second region is formed by doping the semiconductor substrate between the first region and the first gate with a second dopant density lower than the first dopant density,
    the second source-drain region comprises a third region and a fourth region,
    the wordline is coupled to the third region of the second source-drain region,
    the third region is formed by doping the semiconductor substrate with the first dopant density,
    the fourth region is formed by doping the semiconductor substrate between the third region and the second gate with the second dopant density, and
    the gate region comprises a central region that is formed in the semiconductor substrate between the first gate and the second gate.

17. The nonvolatile memory device of claim 2, wherein:
    the plurality of memory blocks are arranged in a column direction,
    the plurality of serial-gate transistors are arranged in a matrix of rows and columns, and two gate lines forming the first gate and the second gate are disposed with respect to each row of the plurality of serial-gate transistors such that the two gate lines extend in a row direction and are arranged in the column direction.

18. The nonvolatile memory device of claim 1, wherein:
the plurality of memory blocks are arranged in a column direction, and
the plurality of pass transistor blocks are disposed and distributed in two sides of the plurality of memory blocks in a row direction.

19. A serial-gate transistor, comprising:
a first source-drain region, a gate region, and a second source-drain region, wherein the first source-drain region, the gate region, and the second source-drain region are sequentially arranged in a horizontal direction at a semiconductor substrate; and
a plurality of gates sequentially arranged in the horizontal direction in the gate region above the semiconductor substrate,
wherein the plurality of gates are electrically decoupled from each other,
wherein each gate of the plurality of gates is directly coupled to a corresponding block selection signal of a plurality of block selection signals, and
wherein the plurality of gates are controlled independently of each other.

20. A nonvolatile memory device, comprising:
a plurality of first bonding metal patterns disposed in a cell region;
a plurality of second bonding metal patterns disposed in a peripheral region disposed under the cell region, wherein the peripheral region is vertically coupled to the cell region by the plurality of first bonding metal patterns and the plurality of second bonding metal patterns;
a memory cell array disposed in the cell region, the memory cell array comprising a plurality of memory blocks; and
a plurality of pass transistor blocks disposed in the peripheral region, each pass transistor block of the plurality of pass transistor blocks comprising a plurality of serial-gate transistors configured to transfer a plurality of driving signals to a corresponding memory block of the plurality of memory blocks, each serial-gate transistor of the plurality of serial-gate transistors comprising:
a first source-drain region, a gate region, and a second source-drain region that are sequentially arranged in a horizontal direction at a semiconductor substrate;
a plurality of gates that are sequentially arranged in the horizontal direction in the gate region above the semiconductor substrate,
wherein the plurality of gates are electrically decoupled from each other,
wherein each gate of the plurality of gates is directly coupled to a corresponding block selection signal of a plurality of block selection signals, and
wherein the plurality of gates are controlled independently of each other.

* * * * *